United States Patent
Akay

(10) Patent No.: US 11,498,845 B2
(45) Date of Patent: Nov. 15, 2022

(54) CATALYTIC MULTI-REACTION ZONE REACTOR SYSTEM

(71) Applicant: ONDOKUZ MAYIS ÜNIVERSITESI, Atakum/Samsun (TR)

(72) Inventor: Galip Akay, Samsun (TR)

(73) Assignee: ONDOKUZ MAYIS ÜNIVERSITESI, Atakum/Samsun (TR)

(*) Notice: Subject to any disclaimer, the term of this patent is extended or adjusted under 35 U.S.C. 154(b) by 203 days.

(21) Appl. No.: 16/338,243

(22) PCT Filed: Sep. 28, 2017

(86) PCT No.: PCT/TR2017/050457
§ 371 (c)(1),
(2) Date: Mar. 29, 2019

(87) PCT Pub. No.: WO2018/182551
PCT Pub. Date: Oct. 4, 2018

(65) Prior Publication Data
US 2020/0031681 A1 Jan. 30, 2020

(30) Foreign Application Priority Data
Sep. 29, 2016 (GB) .................................. 1616517

(51) Int. Cl.
*C01C 1/04* (2006.01)
*B01J 19/08* (2006.01)
(Continued)

(52) U.S. Cl.
CPC ........... *C01C 1/0494* (2013.01); *B01J 19/088* (2013.01); *B01J 19/10* (2013.01); *B01J 19/123* (2013.01);
(Continued)

(58) Field of Classification Search
CPC . B01J 20/26; B01J 20/24; B01J 20/261; B01J 20/20; B01J 20/262; B01J 20/267;
(Continued)

(56) References Cited

U.S. PATENT DOCUMENTS 4,291,006 A * 9/1981 Pagani ................... C01C 1/0488
423/359
5,077,030 A 12/1991 Yogev
(Continued)

FOREIGN PATENT DOCUMENTS

EP 1 183 328 B1 8/2012
EP 2 342 272 B1 9/2013
(Continued)

OTHER PUBLICATIONS

International Search Report and Written Opinion of the International Searching Authority for International Patent Application No. PCT/TR2017/050457 dated Dec. 14, 2018, 12 pages.
(Continued)

*Primary Examiner* — Steven J Bos
*Assistant Examiner* — Syed T Iqbal
(74) *Attorney, Agent, or Firm* — Merchant & Gould P.C.

(57) ABSTRACT

The present invention is a production method for ammonia and ammonia derivatives in a Multi-Reaction Zone Reactor. Said production method comprising the steps of: a) producing at least some section of ammonia as a result of balance reaction of ammonia by means of nitrogen and hydrogen catalyst in at least one primary reaction zone (RZ-1), b) realizing absorption by means of chemical or physical absorbents of at least some section of ammonia which is in gas form and which is produced in primary reaction zone (RZ-1) in at least one secondary reaction zone (RZ-2) which is not separated by discrete physical barriers with the primary reaction zone (RZ-1).

18 Claims, 9 Drawing Sheets

(51) Int. Cl.
*B01J 19/10* (2006.01)
*B01J 19/12* (2006.01)
*C01C 1/26* (2006.01)
*C05C 3/00* (2006.01)

(52) U.S. Cl.
CPC ............ *B01J 19/126* (2013.01); *C01C 1/0405* (2013.01); *C01C 1/26* (2013.01); *C05C 3/00* (2013.01); *B01J 2219/0809* (2013.01); *B01J 2219/0871* (2013.01); *B01J 2219/0892* (2013.01); *B01J 2219/0894* (2013.01)

(58) Field of Classification Search
CPC ............ B01J 20/28016; B01J 20/28023; B01J 20/28026; B01J 20/3021; B01J 20/3085; B01J 2220/46; B01J 2220/68; B01J 20/041; B01J 20/103; B01J 20/18; B01J 20/223; B01J 20/264; B01J 20/28004; B01J 20/28011; B01J 20/28033; B01J 20/28057; B01J 20/3064; B01J 20/3078; B01J 20/3204; B01J 20/3236; B01J 20/3293; B01J 2220/4831; B01J 2220/49; B01J 2220/66
See application file for complete search history.

(56) References Cited

U.S. PATENT DOCUMENTS

| | | | |
|---|---|---|---|
| 7,820,729 | B2 | 10/2010 | Akay et al. |
| 8,898,955 | B2 | 12/2014 | Akay et al. |
| 9,416,019 | B2 | 8/2016 | Akay |
| 2004/0141910 | A1 | 7/2004 | Vizoso |
| 2005/0126984 | A1* | 6/2005 | Scheper ............ B01D 39/1623 210/435 |
| 2013/0272926 | A1 | 10/2013 | Gordon |
| 2013/0309161 | A1 | 11/2013 | Akay |
| 2015/0014183 | A1* | 1/2015 | Akay ................. B01J 35/10 205/462 |

FOREIGN PATENT DOCUMENTS

| | | |
|---|---|---|
| WO | 2013/108045 A2 | 7/2013 |
| WO | 2015/152518 A1 | 10/2015 |

OTHER PUBLICATIONS

Akay, G. et al., "Agro-process intensification: soilborne microbioreactors with nitrogen fixing bacterium Azospirillum brasilense as self-sustaining biofertiliser source for enhanced nitrogen uptake by plants", Green Process Synth, 1: 427-437 (2012).

Akay, G. et al., "Process Intensification in Ammonia Synthesis Using Novel Coassembled SupportedMicroporous Catalysts Promoted by Nonthermal Plasma", Ind. Eng. Chem. Res., 56: 457-468 (2017).

Akay, G., "Sustainable Ammonia and Advanced Symbiotic Fertilizer Production Using Catalytic Multi-Reaction-Zone Reactors with Nonthermal Plasma and Simultaneous Reactive Sparation", ACS Sustainable Chem. Eng., 5: 11588-11606 (2017).

Edlund, D. et al., "Thermolysis of hydrogen sulfide in a metal-membrane reactor", Journal of Membrane Science, 77(2-3): 255-264 (1993), Abstract only.

Kameyama, T et al., "Productioin of hydrogen from hydrogen sulfide by means of selective diffusion membranes", International Journal of Hydrogen Energy, 8(1): 5-13 (1983), Abstract only.

Patil, B.S., et al., "Plasma N2-fixation: 1900-2014", Catalysis Today, 256: 49-66 (2015).

Patil, B.S., "Plasma (catalyst)—assisted nitrogen fixation: reactor development for nitric oxide and ammonia production", Technische Universiteit Eindhoven, 223 pages (2017).

Peng, P. et al., "Atmospheric Pressure Ammonia Synthesis Using Non-thermal Plasma Assisted Catalysis", Plasma Chem Plasma Process, 36: 1201-1210 (2016).

Shah, J. et al., "Ammonia Synthesis by Radio Frequency Plasma Catalysis: Revealing the Underlying Mechanisms", ACS Appl. Energy Mater., 1:4824-4839 (2018).

* cited by examiner

CATALYTIC MULTI-REACTION ZONE REACTOR SYSTEM

CROSS-REFERENCE TO RELATED APPLICATIONS

This application is a National Stage Application of PCT/TR2017/050457, filed 28 Sep. 2017, which claims the benefit of Serial No. 1616517.7, filed 29 Sep. 2016 in the United Kingdom, and which applications are incorporated herein by reference. To the extent appropriate, a claim of priority is made to each of the above-disclosed applications.

TECHNICAL FIELD

The present invention relates to a production method for ammonia and ammonia derivatives in a Multi-Reaction Zone Reactor.

PRIOR ART

In many reactions involving gaseous reactants and products, the conversion of the reactants to products is often not complete because of the chemical equilibrium between the reactants and products. Therefore, the reaction mixture (effluent) containing the products and unreacted reactants are removed from the reactor and the products are separated from the unreacted reactants which are then recirculated back into the reactor. It is often necessary to de-pressurise and lower the temperature of the effluent to achieve the separation. In some cases, the products or one of the products may have to undergo a further reaction separately. Through the rapid removal of the products from the reaction medium shifts the chemical equilibrium towards the formation of more products thus increasing the yield of the products.

A good and extremely important example of this type of reaction is ammonia synthesis which is carried out at high temperatures (350-500° C.) and pressures (100-250 bar) in industry using mainly fossil fuel feedstock (mainly methane) as the feedstock at very large capacity through a method known as Haber-Bosch process. There are several stages of this method and typical conversion per pass is 15% and therefore, the recovery of ammonia requires both de-pressurisation and cooling. In order to stop global warming, it is necessary to use non-fossil fuel based feedstock, derived from renewables and the production needs to be at a small scale which therefore does not have the benefit of the economies of scale and therefore its cost is large. In order to compete with the large scale Haber-Bosch ammonia production or indeed other gas conversion processes (such as conversion of methane or carbon monoxide to liquid fuel or production of hydrogen from renewables) new types of reactors which operate at small scale with a small foot-print and large energy efficiency are needed.

In obtaining small but efficient reactors, the tendency is to make the reactors and processes similar to the existing technology but with better catalysts and heat and mass transfer efficiency. For example, in ammonia production the effluent is passed through an ammonia absorbing material so that the ammonia removal/separation is more efficient. The absorbed ammonia with its absorbing media is then recovered and ammonia is regenerated. Although this provides some advantages in reducing the cost of ammonia, it is still far away from the present cost of Haber-Bosch ammonia.

Operating at small scale provides certain advantages where the reactions can be controlled more efficiently. The control of the reaction is through the selective initiation of reactive species which then react catalytically to produce the desired product. Furthermore, due to the vastly reduced diffusion paths in small reactors, diffusion resistance is also reduced.

As a result, because of all of the above mentioned problems, an improvement is required in the related technical field.

BRIEF DESCRIPTION OF THE INVENTION

The present invention relates to a novel catalytic multi-reaction zone reactor system, for eliminating the above mentioned disadvantages and for bringing new advantages to the related technical field.

The main object of the present invention is to provide, a novel catalytic reactor system in order to increase the overall reaction efficiency in terms of selectivity and conversion.

Another object of the present invention is to provide, examples whereby this type of reactor is suitable for obtaining products which are otherwise manufactured by several steps using different reactors and processes.

In order to realize all of the abovementioned objects and the objects which are to be deducted from the detailed description below, the present invention is a production method for ammonia and ammonia derivatives in a Multi-Reaction Zone Reactor. Accordingly, comprising the steps of:

a) producing at least some section of ammonia as a result of balance reaction of ammonia by means of nitrogen and hydrogen catalyst in at least one primary reaction zone, b) realizing absorption by means of chemical or physical absorbents of at least some section of ammonia which is in gas form and which is produced in primary reaction zone in at least one secondary reaction zone which is not separated by "discrete physical barriers" with the primary reaction zone.

In a preferred embodiment of the invention, the primary reaction zone of the multi-reaction zone reactor system is a Dielectric Barrier Discharge (DBD) nonthermal plasma reactor.

In a preferred embodiment of the invention, the temperatures of each reaction zone are controlled by means of at least one heating/cooling coil.

In a preferred embodiment of the invention, in said heating/cooling coil, at least one of nitrogen, carbon-dioxide is circulated.

In a preferred embodiment of the invention, in step (a), the temperature is adjusted to be between 100 and 300° C.

In a preferred embodiment of the invention, in step (a), the temperature is adjusted to be between 200 and 240° C.

In a preferred embodiment of the invention, in step (b), the realized reaction and/or transformations are catalytic and they are activated by an energy source.

In a preferred embodiment of the invention, the ammonia formed in step (a) is activated by means of reactive and activated chemicals in step (b).

In a preferred embodiment of the invention, in step (b), the reactions and/or transformations are substantially high exothermic reactions which do not require substantial activation energy.

In a preferred embodiment of the invention, in step (b), the temperature is adjusted to be room temperature.

In a preferred embodiment of the invention, in step (a), the $NH_3$ production reaction is activated by a high density and selective energy source.

In a preferred embodiment of the invention, as said high density and selective energy source; at least one of plasma, microwave, UV, electric field or ultra sound is used.

In a preferred embodiment of the invention, in step (b), polymeric physical or chemical absorbents are used.

In a preferred embodiment of the invention, in step (b), physical or chemical absorbents are used which are in solid, liquid or gas form.

In a preferred embodiment of the invention, in step (b), porous solid absorbent (sequestration material) is used.

In a preferred embodiment of the invention, in step (b), physical or chemical absorbents, which provide reversible absorption, are used.

In a preferred embodiment of the invention, in step (b), physical absorbents or chemical absorbents, which provide irreversible absorption, are used.

In a preferred embodiment of the invention, in step (b), acid-base neutralization reactions are realized and $NH_3$ absorption is achieved.

In a preferred embodiment of the invention, in step (b), a solid acid, which is in granule or hydrophilic micro-porous foam form, absorbs $NH_3$ and a symbiotic fertilizer is produced.

In a preferred embodiment of the invention, as solid acid, sulphonated micro-porous polymer foam is used.

In a preferred embodiment of the invention, sulphonated micro-porous polymer foam is made of styrene-divinyl benzene precursor.

In a preferred embodiment of the invention, as sulphonated micro-porous polymer foam, s-Poly HIPE Polymer (s-PHP) is used.

In a preferred embodiment of the invention, in step (b), liquid acid is used as absorbent in ammonia absorption and solid ammonium salt precipitation is produced.

In a preferred embodiment of the invention, acetic acid is used as liquid acid.

In a preferred embodiment of the invention, in step (b), gaseous carbon-dioxide absorbs $NH_3$ and ammonium carbamete is produced in the absence of any water.

In a preferred embodiment of the invention, in step (b), in the presence of water, ammonium bicarbonate or ammonium carbonate is precipitated when gaseous carbon-dioxide is injected to the precipitation region.

In a preferred embodiment of the invention, in step (a), the produced $NH_3$ is condensed in RZ-3 in step (b) and anhydrous ammonia is produced.

In a preferred embodiment of the invention, $NH_3$ is condensed at a temperature below −33° C.

In a preferred embodiment of the invention, in step (a), syngas is used in ammonia production.

In a preferred embodiment of the invention, in step (a), in the direct conversion of methane into hydrogen and ethylene, high dielectric constant materials are used as plasma catalysis promoter (PCP).

In a preferred embodiment of the invention, in step (a), high dielectric constant materials are used together with catalyst.

In a preferred embodiment of the invention, as high dielectric constant materials, at least one of barium titanate, soda lime glass spheres, other plasma catalysis promoters (PCPs) is used.

In a preferred embodiment of the invention, in the direct conversion of methane into hydrogen and ethylene; the following steps are provided:
 i. A catalytic non-thermal plasma reactor is used in primary reaction zone,
 ii. Ethylene is absorbed by an ionic liquid in the secondary reaction zone.

In a preferred embodiment of the invention, in the conversion of carbon-dioxide into carbon-monoxide, the following steps are provided:
 In primary reaction zone, oxygen is removed from carbon-dioxide by means of a catalytic plasma reactor,
 Said oxygen is removed by means of reactive absorption by the activated carbon present in the secondary reaction zone.

In a preferred embodiment of the invention, in step (a), catalyst is used in the conversion of carbon-dioxide into carbon-monoxide.

In a preferred embodiment of the invention, in step (a), high surface area silica supported nickel catalyst which is produced through microwave irradiation of catalyst and support solution, is used as catalyst.

In a preferred embodiment of the invention, in step (a), catalyst in particle form mixed with PCPs is used.

In a preferred embodiment of the invention, in step (a), catalyst which is in porous metal mesh form is used.

In a preferred embodiment of the invention, in the conversion of carbon-dioxide into carbon-monoxide, soda lime glass PCPs are used.

In a preferred embodiment of the invention, in the conversion of carbon-dioxide into carbon-monoxide, barium titanate PCPs are used.

In a preferred embodiment of the invention, the conversion of carbon-dioxide into carbon-monoxide is realized in the presence of nitrogen gas between 2.5 v %-50 v %.

In a preferred embodiment of the invention, the oxygen, released in the conversion of carbon-dioxide into carbon-monoxide, is used to oxidize reactive activated charcoal, and more carbon-monoxide is produced.

In a preferred embodiment of the invention, solid form absorbent, comprising metal salts, is used.

In a preferred embodiment of the invention, solid form absorbent, comprising at least one of $CaCl_2$, $MgCl_2$ or activated nano-porous carbon, metal-organic frameworks, zeolites, metal salts, is used.

In a preferred embodiment of the invention, liquid absorbents, comprising cationic liquids, are used.

In a preferred embodiment of the invention, in step (b), an aqueous solution is produced for capturing ammonia in water and for liquid fertilizer applications.

The present invention is also, a Multi-Reaction Zone Reactor for production of ammonium and ammonium derivatives. Accordingly, the followings zones, which do not separate from each other by any discrete physical barriers, are provided:
 At least one primary reaction zone where at least some of ammonium is produced,
 At least one secondary reaction zone where absorption of at least some section of ammonia, which is in gas form and produced in primary reaction zone, is removed in a selective manner.

In a preferred embodiment of the invention, on the walls of primary reaction zone, there are large pores providing connection to the secondary reaction zone 1 and secondary reaction zone 2.

In a preferred embodiment of the invention, the primary reaction zone, where ammonia is produced, is provided at the center of the Multi-Reaction Zone Reactor and secondary reaction zone is positioned in a manner encircling the primary reaction zone.

In a preferred embodiment of the invention, the primary reaction zone, where ammonia is produced, is provided in the form of a tubular reactor.

In a preferred embodiment of the invention, the primary reaction zone, where ammonia is produced, is provided in the form of a flat plate.

In a preferred embodiment of the invention, on the walls of the primary reaction zone, there are large pores which provide connection to the secondary reaction zone 1 and secondary reaction zone 2.

DETAILED DESCRIPTION OF THE INVENTION

Figure 1:
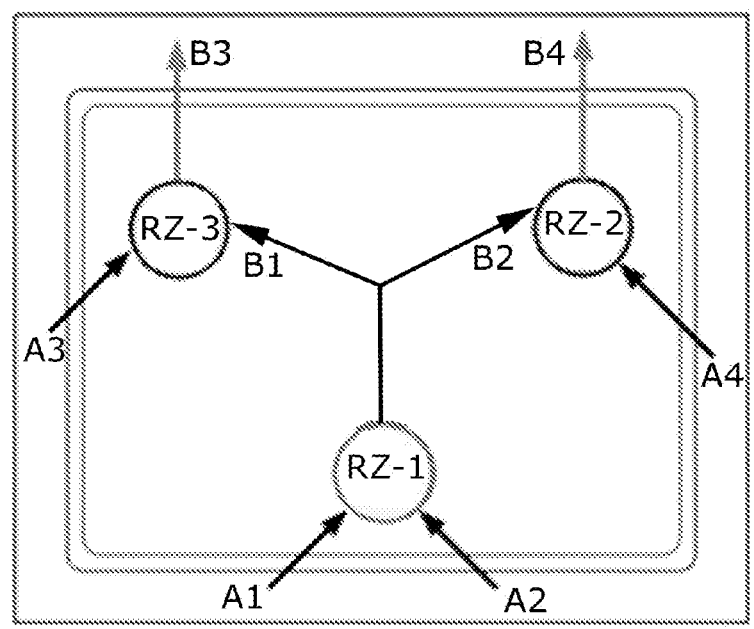
In FIG. 1, diagrammatic illustration of Multi-Reaction Zone Reactor system with Reaction Zones RZ-j (j=1, 2, 3), reactants, $A_i$ and products, $B_i$ (i=1, 2, 3, 4) is given.

In this detailed description, a novel catalytic multi-reaction zone reactor system is explained with references to examples without forming any restrictive effect only in order to make the subject more understandable.

Catalytic Multi-Reaction Zone Reactors

The present invention relates to the design and demonstration of catalytic reactors with multiple reaction zones (RZ-j where j=1, 2, 3 . . . represents the number of reaction zones within the same reactor with little or no mass transfer barriers. In particular we apply this type of reactor to energy conversion processes and use Chemical Looping Carriers (CLC) which sequestrate/scavenge only certain product(s) from the primary reaction zone (RZ-1) selectively through a fast reaction but during the sequestration process (in the reaction zone secondary reaction zone 1 (RZ-2)) they do not interfere with the main reaction in primary reaction zone (RZ-1). As a result of chemical sequestration of a specific reaction product, the reaction path in primary reaction zone (RZ-1) shifts towards the products and most importantly, the sequestrated product with CLC can constitute the main ultimate target product. Otherwise, as in the current process, CLC material and the said sequestrated product have to be brought together separately in a separate reaction vessel to obtain the target product. Hence, the CLC material infact acts as a second catalyst for the main reaction which also takes place in the presence of another catalyst. If the reaction in primary reaction zone (RZ-1) creates another gaseous product, it could be sequestrated in the secondary reaction zone 2 (RZ-3).

The current industrial chemical reactors are single, focussed vessels operating in batch, semi-batch or continuous mode. After the desired conversion of the reactants, reaction products and unreacted reactants are often separated in a second stage operation and the unreacted reactants are recycled and the products are further treated. In continuous reactors, especially in Process Intensified reactors, it is possible to carry out the product separation from the reaction mixture in-situ which is highly desirable when the conversion is restricted by the thermodynamic equilibrium or when undesirable side reactions can take place due to long residence time or temperature increase.

This type of in-situ separation is invariably achieved by using selective membranes in which the pore size is dictated by the size of the molecules to be separated. However, for gas phase reactions such as those involving energy conversion processes it is necessary to use Perovskite based dense inorganic membranes where the selective gas transport is through an electrochemical process with ion or atom diffusion. Diffusion and selectivity can be enhanced by temperature and the application of process intensification fields such as an electric field. Nevertheless, the use of membranes in gas separation under reaction conditions have several drawbacks such as chemical fouling, poisoning, membrane defects and sealing. Although these membrane separations can be useful at small scale selective reactions, permeate fluxes are too small for most industrial operations thus requiring a large membrane surface area.

The permeate flux across the membrane is described by a potential function which is often divided into two: Flux due to chemical potential and flux due to electrical potential. This potential function can be further generalised to take into account of both the thermodynamic and deformation state of the diffusing species by using a modified potential function which is dependent on the free energy change as well as energy state associated with deformation/flow. Free energy change describes the thermodynamic state variables such as enthalpy, temperature, entropy and concentration and pressure whereas deformation state function describes molecular orientation and flow. However, for our purpose, when describing the potential function we can ignore the deformation state of the diffusing/reacting species. Nevertheless, we can generalise the description of the chemical potential through free energy or in more simplified form through enthalpy change associated with a chemical reaction. This implies that a reactant can diffuse towards a zone where it potentially undergoes a chemical reaction which results in reduced potential energy. This means such a reactant would diffuse against a positive concentration gradient (so called Fickean diffusion) and within the reactor a diffusion based separation would be set-up. However, in the present invention, there are no physical barriers such as the walls of a membrane separating two reaction zones. The only barrier against the diffusion of the reactant generated at the initial reaction in Reaction Zone-1, is the length that it must travel to the second reaction zone where it will undergo sequestration by the CLC material. However, further mass transfer barrier may be present at the CLC site if the reactive sites of CLC for sequestration are not easily accessible. The diffusion by the reactant to be sequestrated will be further delayed if the sequestration reaction kinetics is slow.

The above theoretical background indicates the importance of the following parameters, (1) length scale for diffusion, (2) accessibility of the reactive sites for chemical reaction, (3) sequestration reaction kinetics. Therefore, for a successful Multi-Reaction Zone Reactor (M-RZR) system, we must circumvent these restrictions and include catalysis as well as further enhancement of the reactions through the imposition of a process intensification field such as electric, radiation (UV or microwave) and plasma fields.

By definition, M-RZR system incorporates several sequential processes within one reactor. It is therefore not possible to apply this reactor system where repeated pressurisation-depressurization or heating-cooling between different stages are necessary. In such system, the use of catalysts at different reactions zone can be considered in order to eliminate the need for pressure and temperature swings. The use of a catalyst is also necessary in each reaction zone so that only the reactions with a specific catalyst takes place.

The M-RZR approach is applicable in different scales; ranging from very large (metre scale) industrial scale systems to micro-reactor systems (millimetre scale) to micro-nano reactors (micro-meter scale). As regards the applications of the M-RZR reactor system we consider the reactions relevant to energy conversion processes in general and in particular ammonia synthesis and fertiliser production from renewable sources such as biomass. As part of ammonia-fertiliser syntheses, we also consider some of the upstream reactions where the M-RZR system is applicable in microscale.

Production of Ammonia and Ammonia Based Fertilisers

Ammonia and fertiliser syntheses are also very important in industry and the current, so called Haber-Bosch process has been in use for more than 100 years. Typically, it operates at 100-250 bar pressure and 350-500° C. temperature. The conversion of ammonia to fertilisers requires another processing stage. The anhydrous aqueous ammonia is also considered as a fuel and a means of hydrogen storage. In the Haber-Bosch process, the basic reaction is:

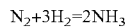

However, due to the chemical equilibrium, the reaction is not complete and the concentration of ammonia in the outlet of the reaction is at best 15% (by volume). Therefore, the reaction mixture is depressurised and cooled and ammonia is separated followed by the recirculation of the unreacted $N_2$ and $H_2$ until the desired conversion is reached. Some 85% of ammonia is then converted to fertilisers including urea, ammonium nitrate, ammonium phosphate or ammonium carbonate.

Symbiotic Fertilisers

Recently, the author and his coworkers have shown that a new type of fertiliser with ammonium compounds can be obtained by using highly hydrophilic foams based on cross-linked and Styrene-Divinyl benzene co-polymer, generically known as PolyHIPE Polymer (PHP). [G. Akay and D. Burke, U.S. Pat. No. 8,898,955 and G. Akay and S. Fleming, Green Processing and Synthesis, Vol. 1, pp. 427-437 (2012)] In order to impart hydrophilicity, PHP is sulphonated (s-PHP) and subsequently neutralised with ammonia (sn-PHP) in order to fill s-PHP with ammonia nutrient. S-PHP, but sn-PHP becomes part of the plant root system and delivers large crop yield enhancements especially under water and nutrient stress because the plant roots penetrate into the sn-PHP. These materials in soil essentially enhance the surface area for biochemical mass transfer at the root-soil interface which is known as 'RhizoSphere'. Sn-PHP can also contain bacteria within its pores and they can act as a source of fertiliser as well as promoting nitrogen fixation by legumes. Hence we refer to these materials as Symbiotic RhizoSphere (SRS) media and the SRS-media with fertiliser as Symbiotic Fertiliser.

In this invention we also use SRS-media as an absorber/sequestrator/scavenger for ammonia so that the resulting ammonia filled SRS-media is used as a symbiotic fertiliser. In our previous patent (G. Akay, Ammonia production by integrated intensified processes, U.S. Pat. No. 9,416,019) we used s-PHP in order to remove ammonia and water from ammonia synthesis reactors and the process is repeated until all of $N_2$ and $H_2$ reactants are converted to ammonia. In these reactors, the concentration of $NH_3$ after each stage was no more than 10 v % and the energy efficiency ranged from 200-80 MJ/mol of $NH_3$ produced depending on the design of the reactor and operating conditions. In order to compete with the Haber-Bosch process which uses fossil fuel derived hydrogen and operates at an extremely large scale, the energy efficiency must be ca. 0.5 MJ/mol $NH_3$. In order to achieve energy parity with the Haber-Bosch process, it is deemed that the $NH_3$ outlet concentration must be greater than 15-20 v % (Patil et al. Catalysis Today, Vol. 256, pp. 49-66, 2015) and therefore this must be the target ammonia concentration per pass through the reactor. The upper limit of 20 v % is mainly dictated by the explosion hazard of ammonia rather than any techno-economic considerations.

The ammonia sequestrated SRS-media as an advanced form of fertiliser provides far more advantages than ammonia fertilisers and these symbiotic fertilisers can stay in the soil as long as desired as it is possible to adjust the biodegradability of the base polymer, sn-PHP. Here, the sequestration is infact a process of scavenging because ammonia reacts readily with the sulphonate groups through an acid-base reaction and hence the sequestration is irreversible although the polymer has also a small reversible ammonia absorption capacity.

Ammonia as Hydrogen Fuel for Road Transport

There is a great deal of interest in ammonia as a source of hydrogen for transport fuel applications as both the energy density and fuel characteristics of ammonia are similar to gasoline. The catalytic combustion of ammonia would only yield water without any significant discharge of $NO_x$. It is therefore important to obtain anhydrous ammonia for this transport fuel applications. In this case, it is necessary to use reversible ammonia absorbers which will allow the desorption of ammonia after synthesis.

Several alternative sustainable processes to the Haber-Bosch method are currently under consideration. These processes need to be on a small scale as part of sustainability criteria and hence would not have the benefit of 'Economies of Scale'. The non-thermal catalytic plasma based processes are seen as the best route for ammonia synthesis including nitrogen fixation from air either through ammonia synthesis or by nitric acid synthesis after obtaining nitric oxide (NO) and nitric dioxide ($NO_2$). As in our previous disclosures (U.S. Pat. No. 9,416,019) for example, we have used this basic technique as it provides a process at 1 atm. and 120-250° C. operating temperature.

EXAMPLES

Example-A. Multi-Reaction Zone Reactor System

Referring to FIG. 1, we consider the following catalytic reactions taking place in 3 Reaction Zones (RZs), namely primary reaction zone (RZ-1); secondary reaction zone 1 (RZ-2) and secondary reaction zone 2 (RZ-3).

$$a_1 A_1 + a_2 A_2 \leftrightarrow b_1 B_1(g) + b_2 B_2(g) \Delta G_1 < 0; T_1 \text{ primary reaction zone (RZ-1) Main Reaction} \quad (1)$$

$$b_2 B_2(g) + a_4 A_4 \rightarrow b_4 B_4(s/l) \Delta G_2 < 0; T_2 \text{ secondary reaction zone 1 (RZ-2) Sequestration Reaction-1} \quad (2)$$

$$b_1 B_1(g) + a_3 A_3 \rightarrow b_3 B_3(s/l) \Delta G_3 < 0; T_3 \text{ Reaction Zone-3 Sequestration Reaction-2 (secondary reaction zone 2 (RZ-3))} \quad (3)$$

Here, $a_i$ and $b_i$ are the molar coefficients associated with the reactants $A_i$ and products $B_i$ respectively while $\Delta G_j$ and $T_j$ represent the free energy change and temperature, associated with the reactions taking place in the Reaction Zone-j (RZ-j). The dummy indices i (i=1, 2, 3 . . . ) represent the reactants and products while j=1, 2, 3, . . . represents the reaction numbers and Reaction Zones. In Reactions 1-3 the physical state of some reactants and products (when needed to be specified) are specifically represented as: (g)=gas phase and (s/l)=solid or liquid phase.

For the sake of simplicity, in Eqs. (1)-(3) we assume that the intermediate product $B_1$ (B1) and product $B_2$ (B2) are completely consumed in the secondary reaction zone 1 (RZ-2) and secondary reaction zone 2 (RZ-3) and therefore no intermediate product is recirculated. Furthermore, we assume that the final product $B_3$ (B3) and product $B_4$ (B4) are immobilized/sequestrated through the reactions with the reactant $A_3$ (A3) and reactant $A_4$ (A4) and that these reactants in the reaction zones secondary reaction zone 1 (RZ-2) and secondary reaction zone 2 (RZ-3) do not react with reactant $A_1$ (A1) and reactant $A_2$ (A2). Within the content of ammonia reaction, these assumptions are justified.

Figure 2:
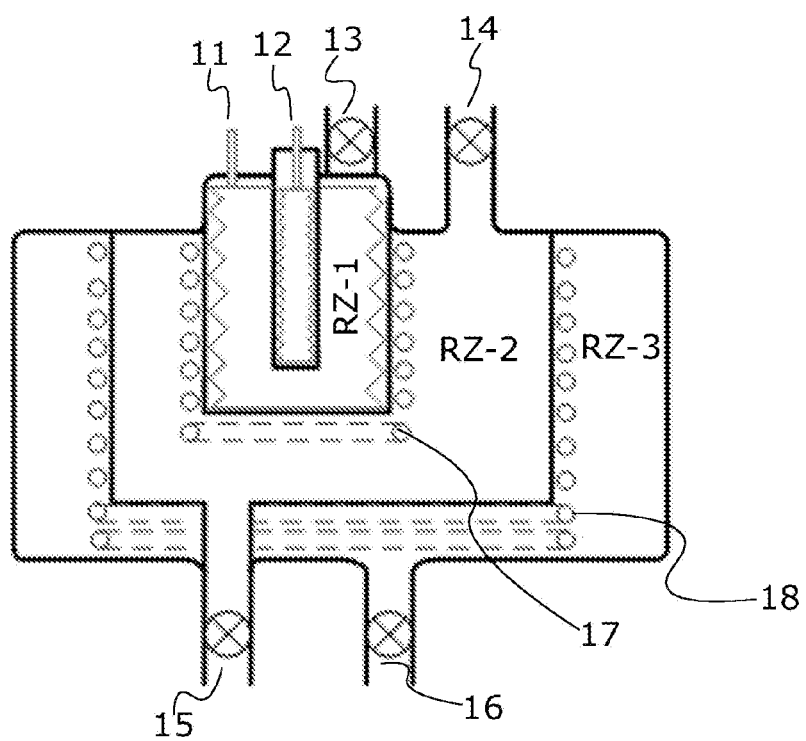
In FIG. 2, diagrammatic illustration of a 3-reaction zone (RZ-j) concentric reactor system with heat transfer facility and plasma reaction in primary reaction zone is given.

A diagrammatic illustration of a practical M-RZR system in which the 3 reaction zones are placed concentrically is shown in FIG. 2. Here, the primary reaction zone (RZ-1) is a catalytic plasma reactor, secondary reaction zone 1 (RZ-2) is a product removal (sequestration/scavenging/absorption) reactor while secondary reaction zone 2 (RZ-3) is the condensation stage. The reactants are fed into the Reaction Zone-1 where an equilibrium reaction takes place (Reaction-1). The product $B_1$ (B1) and product $B_2$ (B2) undergo a reactive separation in which they are immobilized through the reactions in secondary reaction zone 1 (RZ-2) and secondary reaction zone 2 (RZ-3). These immobilization reactions should be preferably an irreversible reaction such as acid-base titration. They can also be adsorption or phase transformation (i.e., condensation or solidification).

The reactants are fed from the primary inlet (13) into the primary reaction zone (RZ-1) which is a nonthermal Dielectric Barrier Discharge (DBD) reactor. Primary inlet (13) is for the reactants ($H_2$ and $N_2$) into the primary reaction zone (RZ-1). The ground electrode (11) and high voltage electrode (12) are powered through a power supply (208) externally as described in U.S. Pat. No. 9,416,019. Primary reaction zone (RZ-1) reactor is made from quartz and it has a solid inner wall (216) housing the high voltage electrode (12). The ground electrode (11) is within the primary reaction zone (RZ-1) reactor space. The outer wall (215) of primary reaction zone (RZ-1) is macro-porous with holes ca. 1 mm in diameter. Therefore, the gaseous products from primary reaction zone (RZ-1) do not have any diffusion barrier or resistance to diffuse away into secondary reaction zone 1 (RZ-2) or secondary reaction zone 2 (RZ-3) reactors where they undergo further exothermic reactions. Outside the macro-porous walls there is a cooling coil which is inside the secondary reaction zone 1 (RZ-2). The secondary inlet (14) into secondary reaction zone 1 (RZ-2) feeds the reactants (Sulphonated PolyHIPE Polymer) and the product from this zone can be removed from primary outlet (15). Primary outlet (15) is an outlet for the product (e.g. ammonia sequestrated sulphonated PolyHIPE Polymer) from the secondary reaction zone 1 (RZ-2). The removal of the ammonia saturated sequestration agent is carried out batchwise with a gas trap to recycle unreacted hydrogen and nitrogen. Alternatively, gases from secondary reaction zone 1 (RZ-2) can pass through the macro-porous walls of secondary reaction zone 1 (RZ-2) into secondary reaction zone 2 (RZ-3) reactor which also has a secondary cooling coil (18). Said secondary cooling coil (18) can be used to condense any ammonia that has not been absorbed by the sequestration agent in secondary reaction zone 1 (RZ-2). Products from secondary reaction zone 2 (RZ-3) are removed from the secondary outlet (16). Secondary outlet (16) is an outlet for n-sequestrated product ($NH_3$) and unreacted reactants ($H_2$ and $N_2$) from the secondary reaction zone 1 (RZ-2).

The unreacted reactants $A_1$ (A1) and reactant $A_2$ (A2) can be recovered and recirculated. However, if the immobilization reactions in secondary reaction zone 1 (RZ-2) and secondary reaction zone 2 (RZ-3) reactors are complete, although the reaction in primary reaction zone (RZ-1) is an equilibrium reaction, the complete removal of product $B_1$ (B1) and product $B_2$ (B2) from RZ-1 means that full conversion of reactant $A_1$ (A1) and reactant $A_2$ (A2) in primary reaction zone (RZ-1) is possible provided that there is sufficient residence time available. Therefore, in the description of a Multi-Reaction Zone Reactor system in FIG. 2, there is no unreacted reactant recovery, and recirculation is present. This assumption can be realised by ensuring that the immobilization reactions in secondary reaction zone 1 (RZ-2) and secondary reaction zone 2 (RZ-3) are complete. It also means that the final product streams associated with product $B_3$ (B3) and product $B_4$ (B4) emerging from secondary reaction zone 1 (RZ-2) and secondary reaction zone 2 (RZ-3) do not contain any unreacted reactants or intermediates.

However, in practice, these reactions will not be 100% complete but in the present case, sequestration/absorption will create solid or liquid products so that the unreacted compounds will be easily removed and circulated. Furthermore, the conversion in Reactions 1-3 will be sufficiently large so as to make the main reaction (1) economically feasible.

Multi-Reaction Zone Reactor for Ammonia and/or Symbiotic Fertiliser Production

FIG. 1 illustrates the separation of intermediate product $B_1$ (B1) and product $B_2$ (B2) from primary reaction zone (RZ-1) and their conversion into the final product $B_3$ (B3)

and product $B_4$ (B4) in the secondary reaction zone 1 (RZ-2) and secondary reaction zone 2 (RZ-3). When applied to ammonia production using $H_2$ and $N_2$, the above proposed reactor can be modified as shown in FIG. 2.

In this reactor, all of the reaction zones (RZ-j j=1, 2, 3) are placed concentrically. The central reactor constitutes primary reaction zone (RZ-1) which is a non-thermal catalytic Dielectric Discharge Plasma (DBD) reactor similar to that used in ammonia synthesis previously (U.S. Pat. No. 9,416,019). $H_2$ and $N_2$ are fed from the inlet port (13) through Mass Flow Controllers (203-n) into the reaction zone containing catalyst and Plasma Catalysis Promoters (PCPs). PCPs are essentially high dielectric constant materials such as barium titanate used as spherical packing in the plasma reaction zone. The high voltage electrode (12) is isolated from the catalyst via a quartz tube while the ground electrode (11) can be in contact with the catalyst. The outer wall (215) of the primary reaction zone (RZ-1) reactor has a set of 8 holes (2 mm diameter) placed circumferentially around the reactor wall, each set of holes separated by 10 mm in the axial direction. Outside the outer wall (215) of primary reaction zone (RZ-1), a heating/cooling coil (17) is placed for temperature control of primary reaction zone (RZ-1) and the secondary reaction zone 1 (RZ-2) which is packed with suitable solid acid particles (such as sulphonated PolyHIPE Polymers (s-PHP) or any solid acid such as polysulphonic acid, citric acid). S-PHP particles are fed from the secondary inlet (14) in order to react with ammonia produced in primary reaction zone (RZ-1). S-PHP particles can be removed from the primary outlet (15) operating with a gas trap facility. The outer wall (215) of secondary reaction zone 1 (RZ-2) reactor is also porous similar to the primary reaction zone (RZ-1) reactor.

Initially, temperature of the plasma zone may need to be increased in order to obtain a stable plasma and hence external heating is achieved trough a heating coil.

The secondary reaction zone 2 (RZ-3) is essentially a refrigeration stage to condense (using the secondary cooling coil (18)) any unabsorbed ammonia in secondary reaction zone 2 (RZ-3) thus essentially acting as a liquid trap. It is also possible to place ionic liquids or indeed water or s-PHP containing water for ammonia absorption. S-PHPs can absorbe ca. 10-30 times of their own weight in water. Undissolved ammonia and unreacted gases are removed from the exit port in secondary reaction zone 2 (RZ-3) and analyzed.

The above reactions are represented below;

$3H_2(g) + N_2(g) = 2NH_3(g)$ primary reaction zone (RZ-1):Ammonia synthesis (4)

$NH_3(g) + RXH(s) = RX\_NH_4(s)$ @secondary reaction zone 1 (RZ-2):(a) Irreversible chemical sequestration of $NH_3$ (5)

$nNH_3(g) + m\ G(g,l,s) = G_m(NH_3)_n\ (s,l)$ @secondary reaction zone 1 (RZ-2):(b) Reversible chemical sequestration of $NH_3$ (6)

$NH_3 + RXNH_4 = RXNH_4 \cdot NH_3$ @secondary reaction zone 1 (RZ-2):(c) Reversible ammonia absorption by $RXNH_4$ matrix (7)

$NH_3 + M = M:NH_3$ @secondary reaction zone 1 (RZ-2): (d) Reversible absorption by complexation with M (8)

$NH_3 + LXH = LX\_NH_4$ @secondary reaction zone 2 (RZ-3):(a) Reversible absorption of by an cationic liquid (9)

$NH_3(g) = NH_3(l)$ @secondary reaction zone 2 (RZ-3): (b) Condensation of ammonia (Refrigeration) (10)

Where RXH is for example R—$SO_3H$ (i.e., sulphonated crosslinked polystyrene as solid acid) or irreversible absorption media. G(g,l,s) represents a sequestration chemical which reacts with $NH_3$ and the resulting compounds can decomposes to $NH_3$ and the sequestrating chemical G. M is a reversible absorption media such as metal salts or metal organic networks and LXH is an ionic (cationic) liquid which can be used to dissolve ammonia as a means of storage although this type of ammonia storage requires moderate pressures, ca. 5 bar to increase ammonia absorption capacity.

When the acidic sites are depleted in sulphonated PHP, it continues to absorb ammonia as represented in Eq. 7 until it is fully saturated. A more efficient ammonia capture can be achieved through the use of cationic liquids which have been developed for ammonia capture and storage. Alternatively, secondary reaction zone 2 (RZ-3) stage (Eq. 10) can represent a refrigeration stage for the recovery of anhydrous ammonia. In the current study, we have only used 2 of the reaction zones, namely primary reaction zone (RZ-1) and secondary reaction zone 1 (RZ-2) in order to evaluate the effectiveness of s-PHP both as regards reactive absorption and separation in order to increase conversion to ammonia because in our experiments, all of the ammonia produced in primary reaction zone (RZ-1) was removed in secondary reaction zone 1 (RZ-2) by solid acid placed in that zone.

Experimental Set-Up for the Evaluation of the Reactors

Figure 3:
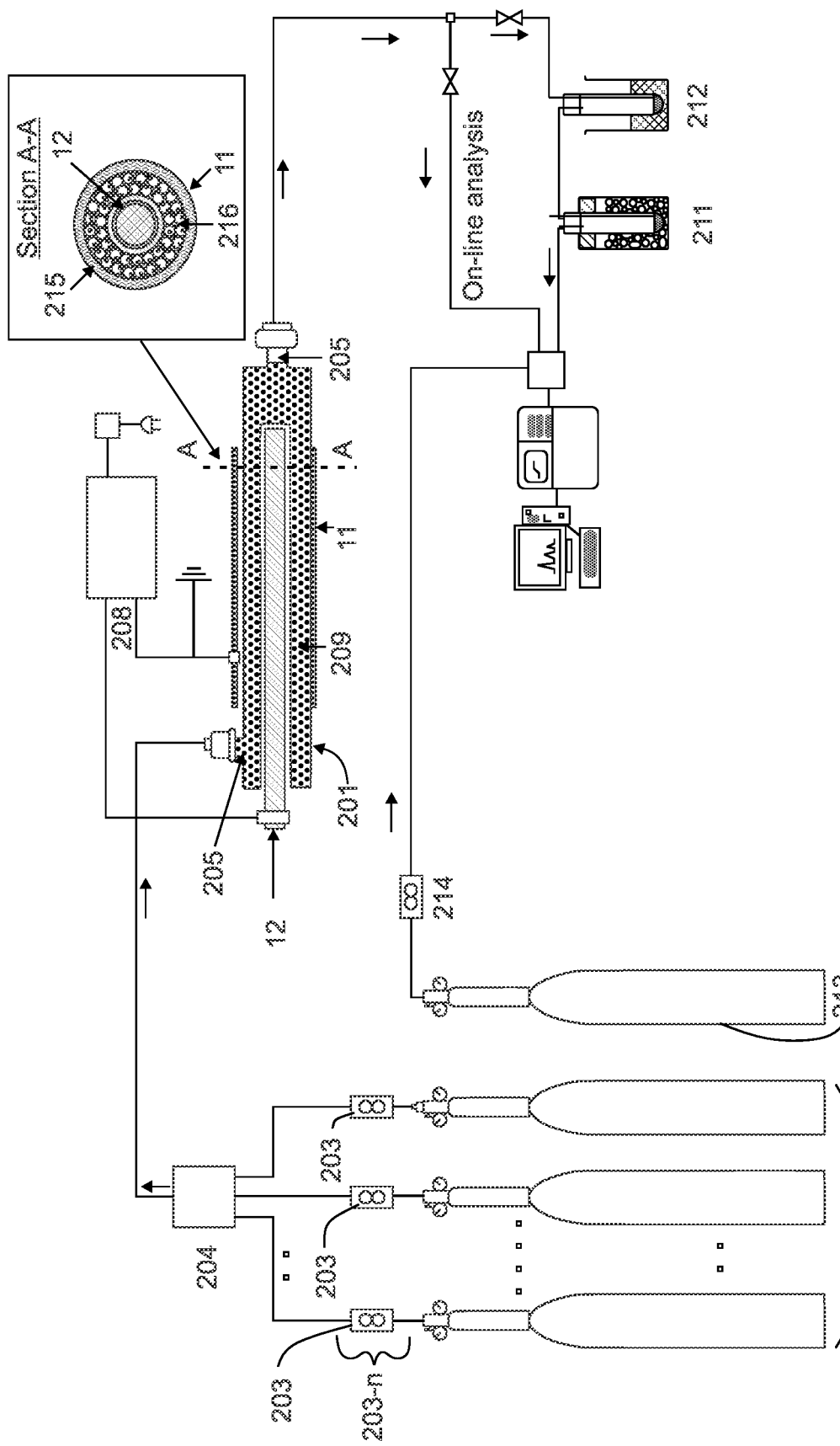
In FIG. 3, flow diagram of the DBD plasma reactor for various applications is given. (Adopted from Akay, G. Ammonia production by integrated intensified processes. G. Akay, Process intensification in the catalytic synthesis of supported catalysts with hierarchic pore structure. PCT Publication, WO2013/108045 (2013).)

In order to evaluate the performance of the M-RZR system and compare it with the single-reactor performance, a general experimental set-up was established. This experimental set up was also used to evaluate performance of the primary reaction zone (RZ-1) reactor and in order to establish a base line and to ensure that the primary reaction zone (RZ-1) reactor itself operates under optimum conditions. FIG. 3 illustrates the flow diagram of the catalytic plasma reactor where the M-RZR as well as the primary reaction zone (RZ-1) reactors were tested. The reactants are fed from the gas cylinders (202-n) through Mass Flow Controllers (203-n) via a primary gas mixer (204). The reaction mixture is analyzed after passing the effluent through a Gas Chromatograph. Alternatively, in the case of ammonia synthesis, effluent was bubbled through a 10 mL of 0.05 M $H_2SO_4$ solution, using methyl orange indicator to monitor the pH change. The colour change (pink to yellow) of the solution indicates the neutralisation of the acid by ammonia in the effluent. Ammonia concentration in the effluent is calculated from $$NH_3\% = 100 * \frac{24.04}{(VH_2 * t + VN_2 * t - 24.04)} \quad (18)$$

Where $VH_2$ is the input volume of hydrogen, and $VN_2$ is the input volume of nitrogen at 20° C.; t is the time used to neutralize 10.0 mL 0.05 M of $H_2SO_4$ by $NH_3$ produced by plasma; 24.04 is the molar volume of gas at 20° C.). When GC is used to determine the concentrations of various species, $N_2$ from the nitrogen cylinder (213) was used as the reference gas. We use the following formulae for Nitrogen Conversion to ammonia (E), Specific Input Energy (SIE). In these equations, R=Hydrogen/Nitrogen molar ratio, W=Molar volume of an ideal gas at 20 C and 1 atmosphere (24.04 L/mol), C=Outlet ammonia concentration, P=Plasma power in Watt, $V_T$=Total volumetric flow rate of the gases into the reactor in L/second $$N_2 \text{Conversion(mole \%)} = 100 * \frac{N_2(\text{mole input}) - N_2(\text{mole output})}{N_2(\text{mole input})} \quad (19)$$

$$E = 1/2C(1+R)/(1+C) \quad (20)$$

$$SIE = [\text{Plasma Power}]/[\text{Molar Flow Rate of Ammonia Produced}] \quad (21)$$

$$SIE(\text{J/mol}) = [W(1+C)P]/[CV_T] \quad (22)$$

In FIG. 3, ice trap (211) is for condensing ammonia. Low temperature trap (212) removes any hydrocarbons such as alcohols for the quantitative determination of hydrocarbons produced when syngas is used to produce ammonia. They are used for analytical purposes. Secondary gas mixer (214) with a non-return valve.

Figure 4:
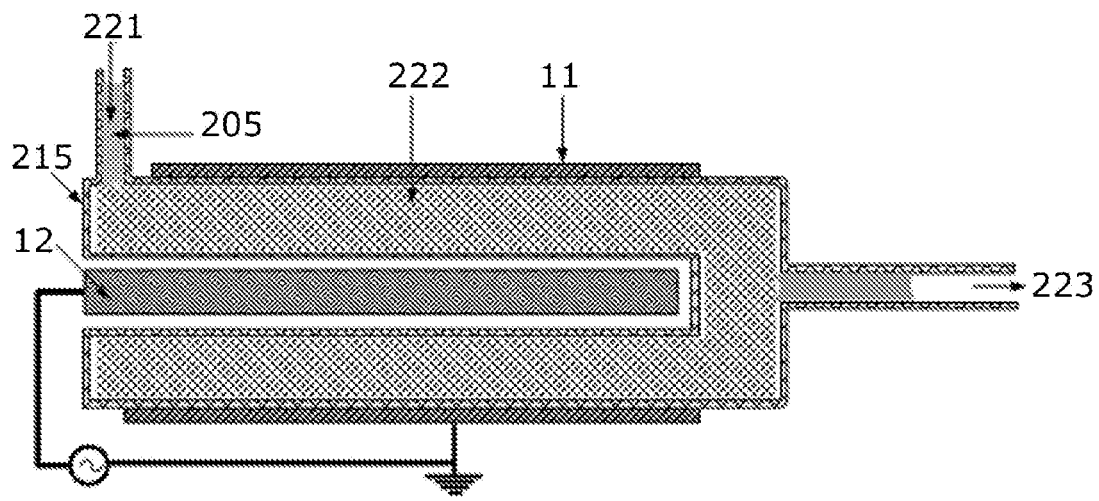
In FIG. 4, basic DBD plasma reactor with non-porous walls made from quartz is given.

The detailed diagram of the primary reaction zone (RZ-1) reactor is also shown in FIG. 4.

In FIG. 4, basic DBD plasma reactor with non-porous walls made from quartz is given. Outer wall (215), High voltage central electrode (207), Inlet for the reactants (221), Glass wool (205), Catalyst and PCP space (222), Ground electrode (11), Product outlet (223). Adopted from G. Akay, Process intensification in the catalytic synthesis of supported catalysts with hierarchic pore structure. PCT Publication, WO2013/108045 (2013).

The outer tube of the primary reaction zone (RZ-1) reactor has an inner diameter of 32 mm and the inner tube has an outer diameter of 17 mm thus giving an annular reactor gap of 7.5 mm. High voltage electrode (12) and the ground electrode (11) are connected to the power supply (208) providing an alternating sinusoidal high voltage up to 20 kV amplitude (peak-to-peak) and 20 kHz frequency. Ground electrode (11) (in the form of stainless steel mesh) can be located either outside the outer tube or inside the reactor while the high voltage electrode (12) is placed inside the inner tube as shown in FIG. 5. The annular gap (209) is filled with catalyst and PCPs in the form of 3 mm $BaTiO_3$ or glass spheres in the reaction zone of 100 cm$^3$ corresponding to the length of the electrodes. Outside the catalyst region, the reactor is packed with glass wool (205) at the inlet and outlet.

Figures 5A, 5B, 5C:
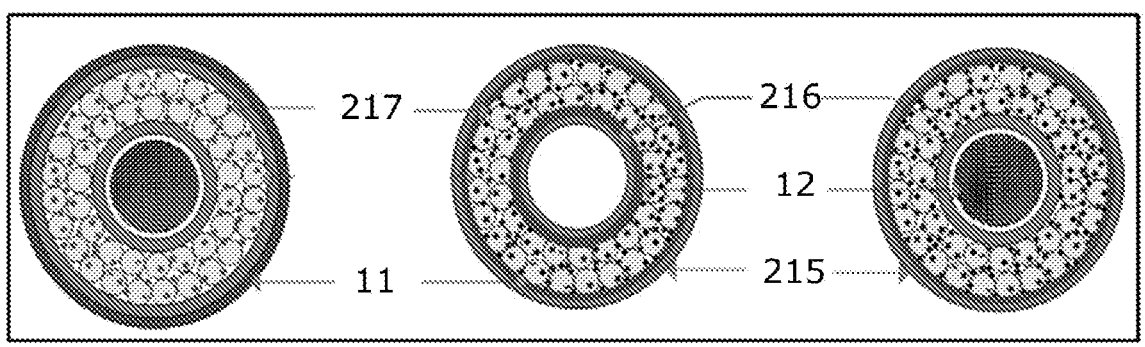
In FIG. 5a, Electrode Configuration (EC) in the primary reaction zone reactor and the presence of Plasma Catalysis Promotors (PCPs) as well as the catalyst. EC-1: Both electrodes are isolated from the reaction zone is given.
In FIG. 5b, EC-3: Both electrodes are located within the reaction zone is given.
In FIG. 5c, EC-2: Ground electrode is within the reaction zone in contact with the PCPs and/or the catalyst is given. (Adopted from G. Akay, Process intensification in the catalytic synthesis of supported catalysts with hierarchic pore structure. PCT Publication, WO2013/108045 (2013)).

FIG. 5 illustrates the electrode configurations in the plasma reactor. Here, the cross-section of the reactor is shown with the high permittivity spheres (glass or barium titanate) mixed with catalyst particles (217). The ground electrode (11) or the high voltage electrode (12) are placed either outside the glass reactor (FIG. 5a) or inside the reactor (FIG. 5b,c). In order to reduce power consumption, it is preferable to use a solid stainless steel rod as the inner electrode when it is in the annular gap (209) as in FIG. 5 a, c. Therefore, the following electrode configurations are available: (i) Both electrodes are outside the reaction space (FIG. 5.a); (ii) Both electrodes are in contact with the reactants and catalysts (FIG. 5b) and (iii) Outer electrode is in contact with the reactants/catalyst (FIG. 5c).

Apart from nitrogen compounds, the concentration of the gases from the reactor outlet are measured by using a Gas Chromatography with a thermal conductivity detector. In order to determine the changes in the volumetric flow rate as a result of chemical reactions, a constant flow nitrogen (6.0 mL/min) was added to the effluent gas stream as reference gas.

A schematic diagram of the experimental setup is depicted in FIGS. 3-5. A coaxial Dielectric-barrier discharge (DBD) reactor was designed and constructed to incorporate HV electrodes for plasma generation. It consisted of two coaxial quartz tubes one inside the other. The outer quartz tube had 32 mm inner diameter (ID) and 300 mm in length. The inner tube had 17 mm outer diameter (OD). The thickness of the quartz tubes was 1.5 mm. Hence the gap between the two tubes was 7.5 mm. The length of the stainless steel mesh electrodes was 17.3 mm, which gave a plasma volume of 100 mL in the reactor. One Stainless steel mesh electrode was fixed into the inner quartz tube, and the other one was fixed on the external surface of the external quartz tube. The discharge was maintained in an annular discharge gap of 7.5 mm radial width and 175 mm length, giving a discharge volume of about 100 ml. The discharge volume of the reactor was filled with 100 mL of PCPs and/or catalyst. We have shown that a 50-50 volume % mixture of the PCP and the silica supported catalyst gave the most energy efficient conversion. Hence, in our experiments when a mixture of PCP and silica supported catalyst is used, their volumetric concentration is 50% each. As the density of the catalyst is very low (ca. 0.2 g/cm$^3$) the weight percentage of such a mixture is ca. 5% catalyst and 95% PCP.

Multi-Reaction Zone Reactor (M-RZR) for Ammonia Production

Figure 6:
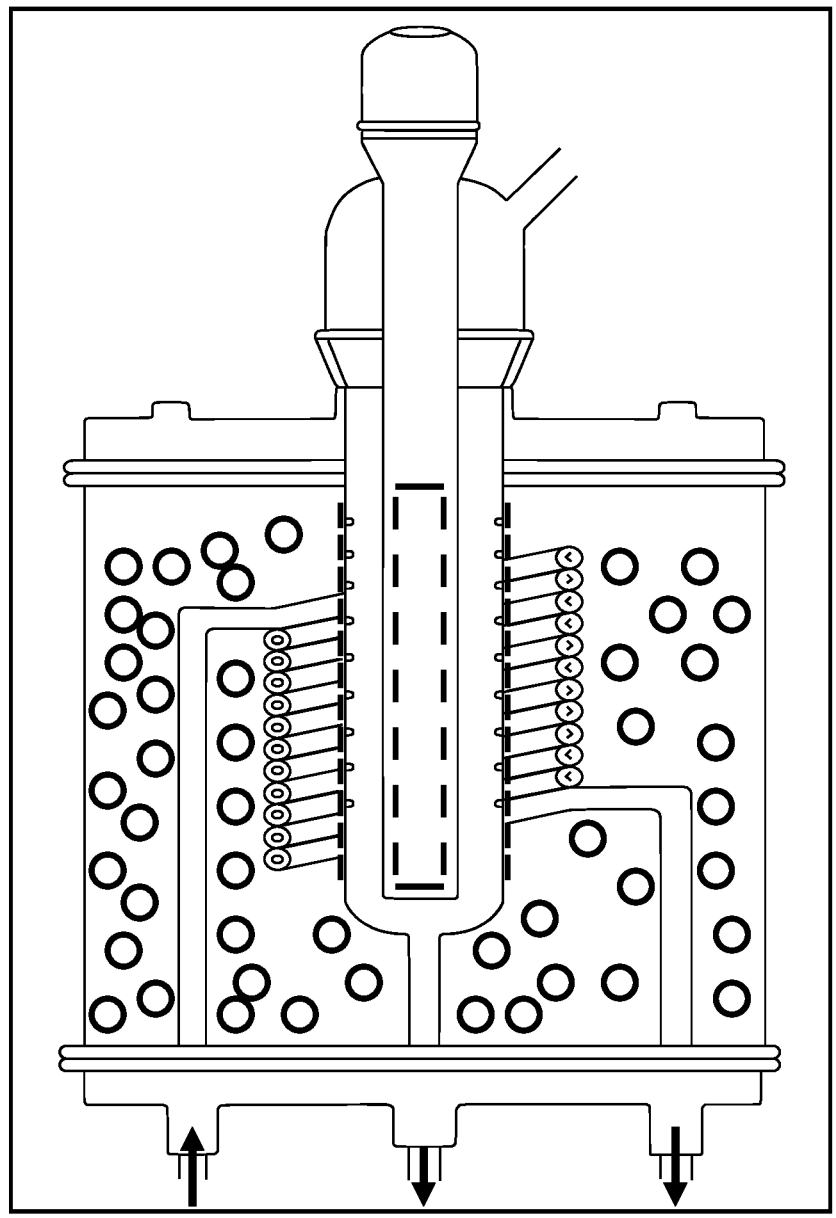
In FIG. 6, diagrammatical illustration of a double reaction zone plasma reactor used in ammonia production is given.

In order to demonstrate the working of the M-RZR we used the reactor shown in FIG. 6, albeit in a batch mode as far as s-PHP was concerned and the Reaction Zone-3 was not used. In this reactor, the primary reaction zone (RZ-1) corresponds to the DBD-Reactor shown in FIG. 4, the performance of which was fully evaluated previously. However, the outer wall (215) of primary reaction zone (RZ-1) is now perforated and the gases are free to diffuse into secondary reaction zone 1 (RZ-2). The diagrammatic illustration of the reactor (without the secondary reaction zone 2 (RZ-3)) is shown in FIG. 6. In this reactor, the reactant gas mixture is fed into the primary reaction zone (RZ-1) reactor space. $BaTiO_3$ PCP and the catalyst are present in the reaction zone. Initial experiments were carried out without any sequestrator/scavenger present in secondary reaction zone 1 (RZ-2) reactor in order to compare the effect of in-situ reactive absorption of ammonia. The experiment was repeated when the secondary reaction zone 1 (RZ-2) reaction space is filled with s-PHP.

In the current experiments, both electrodes were made from stainless steel mesh. The temperature of the primary reaction zone (RZ-1) was ca. 250° C. initially when no s-PHP was used to establish the base-line conversion. However, in the presence of s-PHP acting as an insulator, the temperature of the central reactor was ca. 340° C. at the end of 52 hours of continuous plasma processing. The outside wall of secondary reaction zone 1 (RZ-2) was exposed to room temperature and hence there was a temperature gradient across secondary reaction zone 1 (RZ-2). At these primary reaction zone (RZ-1) temperatures, s-PHP is thermally stable. It is possible to remove the product (ammonia and unreacted gases) from the primary reaction zone (RZ-1) directly as infact shown in FIG. 6. However, in the current experiments, the products are removed from the secondary reaction zone 1 (RZ-2) after passing through the packed bed of s-PHP.

Catalyst Preparation

Throughout this study, we mainly use silica supported nickel catalyst with molar ratio of [Ni]/[Si]=¼ using the method and notation described in: (G. Akay, Catalysts, Vol. 6, Issue 6, 80, 2016) Sufficient amount of catalyst precursor salt, $Ni(NO_3)_2 \cdot 6H_2O$ was dissolved in the catalyst support precursor fluid which consists of silane coated $SiO_2$ particles (5 nm size) dispersed into water at 30 wt % to obtain the desired molar ratio. 10 ml of this fluid was placed in a 19 cm diameter watch glass and subjected to microwave radiation at 1 kW power for a period of 4 minutes at room temperature. As a result of this treatment, an expanded, highly porous silica supported nickel oxide solid mass was obtained. This material (coded as Ni/Si=¼ Mw-A) was then heat treated at 600° C. in order to burn off the silane coating. This material was coded Ni/Si=¼ Mw-AB. Afterwards, NiO was reduced in the tubular reactor described previously, but without the application of plasma although the application of plasma is also beneficial for catalyst stability. Hydrogen at a rate of 50 mL/min (STP) was used for reduction for 24 hours at 550° C. The resulting supported catalyst (in reduced form) was coded as Ni/Si=¼ Mw-ABC. The reduced catalyst was then used in the ammonia synthesis and the resulting spent catalyst was coded as Ni/Si=¼ Mw-ABCD. The porous catalyst has a density of 0.2 g/mL.

The BET surface area of the fresh Ni catalyst (Ni/Si=¼ Mw-ABC) was 186 $m^2$/g, XRD based catalyst crystallite size evaluated from the dominant Ni° peak at 2θ=44.5° was 2.76 nm, reduced from the NiO crystallite size of 3.08 nm evaluated at the dominant NiO peak at 2θ=43.2°

Example-B. Gas Conversion Reactions Using Single Zone Catalytic Plasma Reactors In ammonia production, hydrogen supply is an important part of the process. In the case of hydrogen generation from renewable sources, electrolysis of water using electricity from renewables or de-carbonisation and de-oxygenation of biomass are the only options. Biomass based hydrogen production is best achieved through gasification of biomass and syngas generation with high hydrogen content. Syngas also contains methane, carbon dioxide and carbon monoxide. In general, methane is the primary source of hydrogen and hence we investigate the conversion of methane to hydrogen as a means of decarbonisation of syngas as well as the conversion of carbon dioxide to carbon monoxide which can then be used to generate hydrogen from water. Thus the whole process of ammonia production becomes sustainable. In the process, we also discovered that it is also possible to obtain valuable chemicals such as ethylene.

Example B-1: Conversion of Methane to Hydrogen and Ethylene

Direct methane conversion to hydrogen and higher hydrocarbons ($C_2$, $C_3$, $C_4$, and liquid fuels $C_5$+) is achieved using a single stage nonthermal plasma reactor shown in FIG. 5 using Plasma Catalysis Promoters (PCPs) only. The process flow diagram is as shown in FIG. 3. As PCPs we used 5 mm diameter soda-lime glass and 3 mm diameter $BaTiO_3$ spheres. The reaction can be described by the equation below:

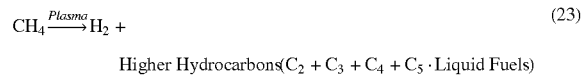

$$CH_4 \xrightarrow{Plasma} H_2 + \quad (23)$$

Higher Hydrocarbons($C_2 + C_3 + C_4 + C_5 \cdot$ Liquid Fuels)

The high voltage-generator could feed between 0 and 150 W into the plasma reactor by adjusting the amplitude of the applied voltage. The power factor of the power source unit was >0.95. The power consumed by plasma was measured by a plug-in power meter. The plasma power dissipated in the discharge was calculated by integrating the product of voltage and current.

An alternating sinusoidal high voltage of up to 20 kV amplitude (peak-to-peak) and about 20 kHz frequency was applied to the two stainless steel mesh electrodes. The discharge was maintained in an annular discharge gap of 7.5 mm radial width and 175 mm length, giving a discharge volume of about 100 ml.

Methane conversion ($E[CH_4]$) to hydrogen and higher hydrocarbons and hydrogen selectivity ($S[H_2]$) are defined as;

$$E[CH_4]=100\times(\text{Inlet methane flow rate--Outlet methane flow rate})/(\text{Inlet methane flow rate}) \quad (24)$$

$$S[H_2]=100\times(\text{Moles of } H_2 \text{ produced})/(2\times\text{moles of } CH_4 \text{ converted}) \quad (25)$$

The summary of the results are tabulated through Tables B-1.1 to B-1.5.

Example B-1.1. Influence of Input Power on the Reaction Over Sodalime Glass Spheres The variation of $CH_4$ conversion and hydrogen selectivity with plasma power is given in Table B-1.1. Here, the Electrode Configuration-1 is used and the input flow rate of methane was 25 mL/min.

TABLE B-1.1

| Effect of Plasma Power on $CH_4$ Conversion over Sodalime Glass Spheres. | | | |
|---|---|---|---|
| Plasma Power (W) | 80 | 100 | 120 |
| $CH_4$ Conversion (mol. %) | 22.4 | 28.0 | 33.7 |
| Hydrogen selectivity (mol %) | | | |
| Selectivity to $H_2$ (mol %) | 59.4 | 59.0 | 55.7 |
| Carbon Number Selectivity (mol %) | | | |
| $C_2$ | 20.0 | 18.4 | 16.6 |
| $C_3$ | 19.2 | 19.0 | 18.0 |
| $C_4$ | 17.6 | 18.0 | 17.2 |
| $C_5$+* | 43.2 | 44.6 | 48.2 |

Example B-1.2. Influence of Flow Rate on the Reaction Over Sodalime Glass Spheres The variation of $CH_4$ conversion and hydrogen selectivity with methane flow rate at various plasma power levels is given in Table B-1.2. Here, the Electrode Configuration-1 is used.

TABLE B-1.2

Effect of Flow Rate on $CH_4$ Conversion over Sodalime Glass Spheres

| Plasma Power (W) | 120 | 100 | 100 | 100 |
|---|---|---|---|---|
| Flow rate (mL/min) |  | 25 | 37.5 | 50 |
| $CH_4$ Conversion (mol. %) | 33.7 | 28 | 20 | 15.6 |
| Hydrogen Selectivity (mol %) | | | | |
| Selectivity to $H_2$ (mol %) | 55.7 | 59.0 | 59.1 | 60.1 |
| Carbon Number Selectivity (mol %) | | | | |
| $C_2$ |  | 16.6 | 18.4 | 40.7 | 43.7 |
| $C_3$ |  | 18.0 | 19.0 | 19.7 | 20.3 |
| $C_4$ |  | 17.2 | 18.0 | 19.2 | 19.2 |
| $C_5+$* |  | 48.2 | 44.6 | 20.4 | 16.8 |

$C_5+$*: calculated from carbon number balance.

Example B-1.3. $CH_4$ Conversion Over $BaTiO_3$ Spheres (3 Mm in Diameter)

Influence of input power on the reaction over $BaTiO_3$ spheres is tabulated in Table B-1.3. Here the variation of methane conversion and hydrogen selectivity are shown as a function of plasma power at constant flow rate of 50 mL/min.

TABLE B-1.3

Effect of Plasma Power on $CH_4$ Conversion over $BaTiO_3$ Spheres

| Plasma Power (W) | 46 | 66 | 86 | 106 |
|---|---|---|---|---|
| $CH_4$ Conversion (mol %) | 4.9 | 9.7 | 14 | 20.7 |
| Hydrogen selectivity (mol %) | | | | |
| Selectivity to $H_2$ (mol %) | 37.4 | 39 | 42.3 | 41.6 |
| Carbon Number Selectivity (mol %) | | | | |
| $C_2$ | 43.6 | 38.1 | 40.5 | 37.6 |
| $C_3$ | 15.8 | 17.6 | 19.7 | 18.8 |
| $C_4$ | 26.7 | 19.2 | 18.3 | 16.7 |
| $C_5+$* | 13.9 | 25.5 | 21.4 | 26.9 |

$CH_4$: 50 mL/min; Reference gas N2: 6 mL/min; $C_5+$*: calculated from carbon number balance.

Example B-1.4. $CH_4$ Conversion Over $BaTiO_3$ Spheres (3 mm in Diameter)

Influence of input methane flow rate on methane conversion and hydrogen selectivity at constant plasma power level is shown in Table B-1.4.

TABLE B-1.4

Effect of Flow Rate on $CH_4$ Conversion over $BaTiO_3$ Spheres

| Plasma Power (W) | 86 | 86 | 86 | 86 |
|---|---|---|---|---|
| $CH_4$ Flow rate (mL/min) | 12.5 | 25 | 37.5 | 75 |
| $CH_4$ Conversion (mol. %) | 35.3 | 20.8 | 14 | 7.3 |
| Hydrogen Selectivity (mol %) | | | | |
| Selectivity to $H_2$ (mol %) | 39.8 | 41.7 | 47 | 47.2 |
| Carbon Number Selectivity (mol %) | | | | |
| $C_2$ | 32.8 | 37.8 | 46 | 44.5 |
| $C_3$ | 18.1 | 19.8 | 22.5 | 21.8 |
| $C_4$ | 13.9 | 15.8 | 18.6 | 24.2 |
| $C_5+$* | 35.2 | 26.7 | 12.9 | 9.6 |

$C_5+$*: calculated from carbon number balance.

Example B-1.5: Ethylene Production as a Function of SIE

As seen from the Tables B-1.1 to B-1.4, $C_n$-hydrocarbons (n=2, 3, 4, 5) are produced during methane conversion. At low SIE values (i.e., SIE≈100 kJ/L) the main hydrocarbon generated are $C_2$ hydrocarbons (ethylene $C_2H_4$ or ethane $C_2H_6$) at about 40%. However, we found that the main $C_2$ is infact ethylene which is a valuable monomer. The fraction of ethane increases with increasing SIE as shown in Table B-1.5.

TABLE-B-1.5

Variation of Ethane/Ethylene molar ratio ($[C_2H_6]/[C_2H_4]$) as a function of Plasma Power sodalime glass was used as PCP in Reactor-1. Input gas flow rate = 25 mL/min

| SIE (kJ/L) | 48 | 96 | 144 | 192 | 245 |
|---|---|---|---|---|---|
| $[C_2H_6]/[C_2H_4]$ | 0 | 0 | 0.10 | 0.11 | 0.15 |

In order to enhance the yield of ethylene, we can use a 2-Reaction Zone Reactor. In Reaction Zone-1, ethylene is produced through the decomposition of methane while in Reaction Zone-2, ethylene can absorbed using an ionic liquid which dissolves ethylene selectively. Ethylene absorption by ionic liquids is enhanced by the addition of $AgNO_3$. Several ionic liquids have been developed for the absorption of ethylene and they are available in the literature.

Summary of Example B-1:

We discovered that the $CH_4$ conversion $E[CH_4]$ is independent of PCP type as well as the Electrode Configuration but these two process parameters correlate well with the Specific Input Energy. However, $H_2$ selectivity changes with PCP type and Electrode Configuration. Table B-1.6 summarises these results by using the mean methane conversion as a function of SIE.

TABLE B-1.6

Variation of Specific Input Energy (SIE) with Methane conversion for Barium titanate and sodalime glass PCPs using both Electrode Configurations (EC-1 and EC-2)

| SIE (kJ/L) | 100 | 200 | 300 | 400 | 800 |
|---|---|---|---|---|---|
| Mean $CH_4$ Conversion % | 12.4 | 24.3 | 32.8 | 38.9 | 51.0 |

B-2. Carbon Dioxide Conversion in a DBD Reactor

Direct carbon dioxide conversion to CO and $O_2$ in a Dielectric-Barrier Discharge reactor (FIGS. 3-5) was carried out using $BaTiO_3$ (3 mm diameter) or glass (3 mm or 5 mm diameter) PCPs and silica supported Ni catalyst. The reaction is:

$$CO_2 \xrightarrow{Plasma} CO + \frac{1}{2}O_2 \qquad (26)$$

The feed gas, $CO_2$, was introduced into the reactor from high pressure bottles via mass flow controllers (MFCs) (203-$n$), admitting a total gas flow of 12.5 to 100 mL/min. A back pressure valve at the exit of the dielectric barrier discharge reactor was used to monitor the pressure in the reactor.

The reaction products were analyzed online using a Varian 450-GC. The Gas chromatograph was connected to the outlet of the reactor in order to avoid condensation. The mass balance of the reaction was obtained by adding a constant flow of nitrogen (6.0 mL/min) as reference gas to the exit of the reactor in order to monitor the change of volume flow as a consequence of chemical reactions. All results were reported in mole percent. $CO_2$ conversion $E[CO_2]$ is defined as;

$$E[CO_2]=100\times(\text{Moles of } CO_2 \text{ in}-\text{Moles of } CO_2 \text{ out})/(\text{Moles of } CO_2 \text{ in}) \quad (26)$$

Example-B.2.1. Influence of Reactor Configuration on the Reaction Over $BaTiO_3$ Spheres We studied the influence of reactor configuration on $CO_2$ conversion using PCPs with or without catalyst. PCPs were 3 mm BaTiO3 spheres and 5 mm glass spheres while the catalyst was Ni/Si=¼Mw-ABC. The catalyst was only used with $BaTiO_3$ at 50% (by volume) as a mixture.

TABLE B-2.1

$CO_2$ Conversion (mol. %) in a $BaTiO_3$ packed DBD reactor ($CO_2$: 50 mL/min)

| | $CO_2$ Conversion, mol. % | | | | | |
|---|---|---|---|---|---|---|
| | Reactor 1 | | | | | |
| Plasma Power (W) | $BaTiO_3$ (3 mm) + Ni/Si = 1/4M w-ABC[#] | Glass (5 mm) | $BaTiO_3$ (3 mm) | Reactor-2 $BaTiO_3$ (3 mm) | Reactor-3 $BaTiO_3$ (3 mm) | Reactor-4 $BaTiO_3$ (3 mm) |
| 46 | 12.7 | 10.2 | 10.0 | 16.3 | 15.6 | 10.6 |
| 66 | 16.8 | 13.1 | 12.9 | 19.8 | 19.8 | 16.0 |
| 86 | 19.7 | 15.6 | 16.1 | 22.9 | 24.3 | 19.6 |
| 106 | 23.0 | 18.8 | 18.8 | 26.4 | — | 23.6 |

Notes:
1) Reactor 1: Both electrodes insulated and are outside the reactor walls (EC-1);
2) Reactor 2: Ground electrode (11) is within the reaction zone (EC-2);
3) Reactor 3: Both electrodes are within the reactor (EC-3) in which case the applied voltage is limited and at 106 W, direct discharge between the electrodes took place;
4) Reactor 4: Electrode configuration is as Reactor-1 (EC-1) but an additional stainless steel mesh (same as the mesh electrodes used) was placed in the reactor facing the ground electrode (11) across the quartz wall of the reactor.
[#]The catalyst Ni/Si = 1/4Mw-ABC was prepared according to the technique given by G. Akay, U.S. Pat. No. 9,416,019 and Catalysts, Vol. 6 (6) 80. Its characteristics were BET surface area = 186 $m^2/g$; apparent Ni$^0$ catalyst size (as determined by X-Ray Diffraction method) after reduction = 2.76 nm.

It can be seen from Table B-2.1. the best electrode confirmation is when the ground electrode (11) is within the reaction space (Electrode Confirmation-2) although the Electrode Confirmation-3 is also effective at low plasma power values until the electrical discharge between the electrodes starts. The EC-4 based reactor when a metal sheet is present inside the reaction zone facing the ground electrode (11), is also better than the EC-1 (when both electrodes are isolated). It can be seen that the presence of a small amount of Ni/Si=¼Mw-ABC (at ca. 4.5% (by weight) or 50% (by volume)) provides significant enhancement for $CO_2$ conversion to CO.

Example B-2.2 Influence of Flow Rate on the Reaction Over $BaTiO_3$ Spheres

Having established $BaTiO_3$ PCPs have a better potential for $CO_2$ conversion compared with glass PCPs, in our subsequent experiments, we used $BaTiO_3$ as our preferred PCP. Table B-2.2 summarises the effect of $CO_2$ input flow rate on conversion when we used the Reactor-2 (EC=2). It shows that the conversion decreases with increasing flow rate.

TABLE B-2.2

Influence of Flow Rate on $CO_2$ Conversion in a $BaTiO_3$ Packed DBD Reactor (Reactor 2; Plasma Power: 86 W)

| Flow Rate (mL/min) | 25 | 50 | 75 | 100 |
|---|---|---|---|---|
| $CO_2$ Conversion (mol. %) | 27.2 | 16.1 | 13.1 | 10.3 |

Example B-2.3. Influence of Nitrogen Concentration in a Gas Mixture ($N_2+CO_2$)

In the following experiment, we keep the total flow rate as constant (50 mL/min), and vary the nitrogen concentration in the gas mixture ($N_2+CO_2$). It is apparent that adding nitrogen can enhance the $CO_2$ conversion as shown in Table B-2.3. Here 3 mm $BaTiO_3$ PCPs were used at a constant plasma power of 106 W. The Electrode Confirmation-1 was used in the plasma reactor. After about 75% $N_2$ the effect of nitrogen remains constant. This type of reaction is important in $CO_2$ capture from combustion gases such as power plants.

TABLE B-2.3

Influence of $N_2$ concentration on $CO_2$ conversion in a BaTiO3 packed DBD Reactor (Reactor 1; EC = 1 both electrodes are isolated. Plasma Power 106 W)

| | $N_2$ (%) | | | | | | | | | |
|---|---|---|---|---|---|---|---|---|---|---|
| | 0 | 2.5 | 5 | 10 | 20 | 25 | 50 | 75 | 90 | 93 |
| $CO_2$ Conversion (mol. %) | 18.8 | 29.9 | 31 | 33 | 34.6 | 35.7 | 41.6 | 47 | 47.4 | 47.6 |

Example B-2.4. Influence of Plasma Power on $CO_2$ Conversion at Constant $N_2$ Concentration and Flow Rate The effect of nitrogen on $CO_2$ conversion nearly reaches maximum when $CO_2$ and $N_2$ concentrations are the same at 50 v %. We tested the effect of plasma power at this concentration using the Reactor-1 (EC=1) and the total flow rate of 50 mL/min. The results are shown in Table B-2.4. At power rating of ca. 100 W, $CO_2$ conversion of 40 v % can be reached.

TABLE B-2.4

The effect of plasma power on $CO_2$ conversion at constant $N_2$ concentration and flow rate

| | Power (w) | | | | | | |
|---|---|---|---|---|---|---|---|
| | 25 | 46 | 50 | 66 | 75 | 86 | 100 | 106 |
| $CO_2$ Conversion (mol. %) | 13.3 | 21.7 | 22.4 | 29.4 | 31.8 | 36.8 | 39.2 | 41.6 |

Total Flow rate: 50 mL/min; $CO_2/N_2$: 1/1; $BaTiO_3$ balls: 3 mm; 2 electrodes insulated (EC = 1)

Example B-2.5. Influence of Total Gas Flow Rate on $CO_2$ Conversion at Constant Power and Nitrogen Concentration Table B-2.5 summarises the effect of a small amount of $N_2$ (2.5 v %) on $CO_2$ conversion as a function of flow rate at plasma power ratings of 86 and 106 W.

TABLE B-2.5

The effect of 2.5 v % nitrogen on $CO_2$ conversion at constant plasma power as a function of total gas flow rate

| | $CO_2$ Conversion (mol. %) Plasma Power | | | |
|---|---|---|---|---|
| Flow Rate (mL/min) | 86 W | 86 W | 106 W | Note |
| 25 | 27.2 | — | — | $BaTiO_3$ spheres: |
| 50 | 16.1 | 23.5 | 29.9 | 3 mm; 2 electrodes |
| 75 | 13.1 | 18.1 | 21 | insulated (EC = 1) |
| 100 | 10.3 | 13.4 | 16.2 | |
| $N_2$ (mol %) | 0 | 2.5 | 2.5 | |

Example B-2.6. Stability of Carbon Monoxide During $CO_2$ Decomposition in Plasma Instead of using carbon dioxide in the presence or absence of nitrogen, we replaced carbon dioxide by carbon monoxide in the presence or absence of nitrogen. It was found that carbon monoxide was stable and did not decompose to any other components (such as oxygen gas and carbon). There was no measurable reaction (within the accuracy of the experiments) associated with nitrogen either. The experimental conditions were the same as those tabulated in Table B-2.5 except that $CO_2$ was replaced by CO.

However, although CO is not affected by catalytic plasma, the decomposition of $CO_2$ is endothermic and the produced oxygen can react with CO to re-produce $CO_2$. Therefore, the in-situ removal of oxygen species is desirable in order to enhance $CO_2$ conversion. The removal of oxygen through a useful reaction is also desirable.

Example C: Direct Conversion of Syngas to Ammonia, Ammonium Carbamate, Ammonium Bicarbonate or Ammonium Carbonate or Urea The direct conversion of syngas to ammonia clearly eliminates the separation of hydrogen and nitrogen from the other components of syngas, including $CO_2$, CO, $CH_4$ and $C_2H_4$ as well as the minor hydrocarbons $C_nH_mO_k$ where n, m, k are the carbon, hydrogen and oxygen numbers of various components. However, although there is sufficient $N_2$ present in syngas, hydrogen concentration is too low and hence it needs to be enhanced by the addition of hydrogen externally.

In its own right, ammonia is a very efficient absorbent of $CO_2$ at a theoretical capacity of ca. 0.33 mol $CO_2$/mol $NH_3$. Therefore, ammonia has been used for $CO_2$ capture from coal powered power plants and even proposed as a fertiliser in the form of ammonium carbonate $(NH_3)_2CO_3$ or ammonium bicarbonate, $(NH_3)HCO_3$. When these materials are used as fertilisers, this will allow the diffusion of $CO_3^{-2}$ or $HCO_3^-$ ions in soil into ground water aquifers where it can be sequestrated by forming $CaCO_3$ thus achieving $CO_2$ removal from biomass or fossil fuels. The reactions involving $CO_2$ sequestration by $NH_3$ or $NH_3$ sequestration by $CO_2$ are:

$$CO_2(g)+2NH_3(g) \leftrightarrow NH_2COONH_4(s) \text{ (ammonium carbamate)} \quad (27)$$

$$CO_2(g)+NH_3(g) \leftrightarrow H_2O(g)+NH_2CONH_2(s) \text{ (urea)} \quad (28)$$

In the presence of water vapour, the following reactions take place.

$$NH_2COONH_4(s)+H_2O(g) \leftrightarrow (NH_4)_2CO_3(s) \text{ (ammonium carbonate)} \quad (29)$$

$$CO_2(g)+2NH_3(g)+H_2O(g) \leftrightarrow (NH_4)_2CO_3(s) \text{ (ammonium carbonate)} \quad (30)$$

$$CO_2(g)+NH_3(g)+H_2O(g) \leftrightarrow NH_4HCO_3(s) \text{ (ammonium bicarbonate)} \quad (31)$$

All of these fertilisers/adjuncts are highly soluble in water and suitable for fertiliser applications which also results in $CO_2$ sequestration through calcification. Alternatively, if anhydrous ammonia is to be obtained for fuel applications, ammonium carbamate decomposition yields $NH_3$ and $CO_2$. These two gases can be separated through the selective absorption of $CO_2$ or through the condensation of $NH_3$ and $CO_2$ is recycle. Therefore, $CO_2$ itself can be used as a gaseous ammonia sequestrator/scavenger to obtain a solid ammonium carbamate which releases ammonia upon heating.

We used the single zone catalytic plasma reactor shown in FIG. 4. The feed gases, $H_2$, $N_2$, $CH_4$, $CO_2$, CO were introduced into the reactor from high pressure bottles via mass flow controllers (MFCs) (203-n), admitting a total gas flow of 45-50 mL/min. The total gas flow rate at exit is also measured. We used a mixture of silica supported nickel catalyst (Ni/Si=¼Mw-ABC) and $BaTiO_3$ (3 mm) as PCP. The catalyst and PCP concentrations were 50 v % each as this was the optimum concentration determined previously (U.S. Pat. No. 9,416,019). The reaction products were analyzed online using a Varian 450-GC gas chromatography. However, it is not possible to detect $NO_x$ (Mainly NO and $NO_2$) and the concentrations of $NO_x$ were determined from the volume reduction at the outlet and the mass balance on the reactions. The solid/liquid products were collected in an ice trap (211) (after plasma reactor) for further analysis. All results were reported in mole percent. The electrode configuration EC=1 was used.

Results:

After reaction, we detected higher hydrocarbons ($C_2$-$C_5$) in the effluent. At the same time, some solid particles were observed in the trap. Further analysis reveals that the solid material formed after plasma is $(NH_4)_2CO_3$.

Tables C-1, C-2 and C-3 summarize the results obtained when a hydrogen enriched gas mixture containing the gases commonly encountered in syngas generated by gasification. The gas compositions before and after passing through the plasma reactor and processing conditions are shown in in these tables.

Figure 7:
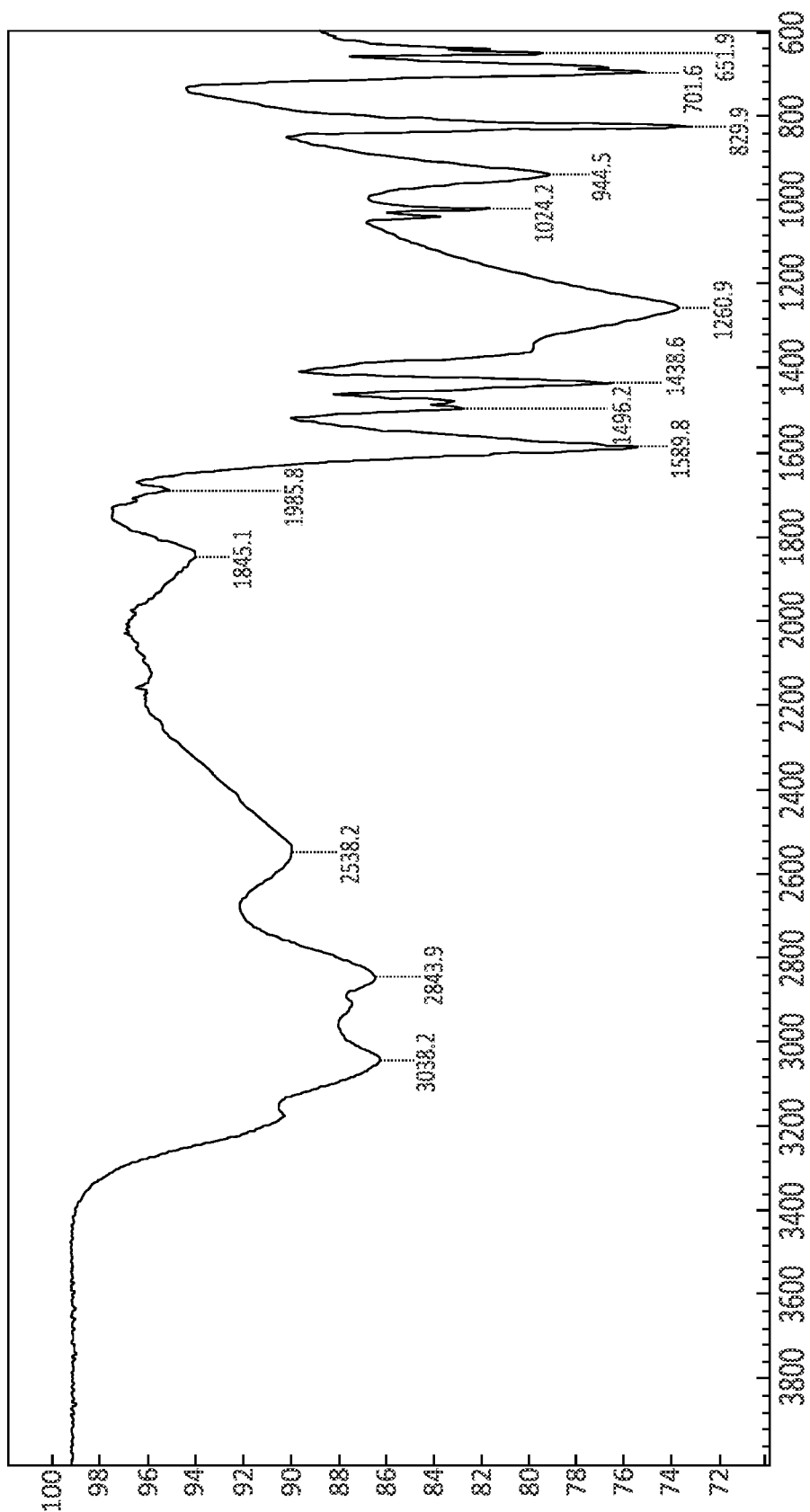
In FIG. 7, FTIR of the solid material recovered from the reaction is given.

In all cases, solid material was obtained which was analyzed by Fourier Transformed Infra Red (FTIR) spectroscopy and found to be ammonium carbonate, rather than ammonium carbamate. This was because during the handling of the material, it absorbed water and transformed to a stable form of ammonium carbonate. FTIR of this material is shown in FIG. 7.

TABLE C-1

Reaction-1: Reaction of hydrogen enriched syngas in the catalytic plasma reactor-1 with $CO_2$ and CO when plasma power was 104 W

| Before reaction Flow rate: 50 mL/min | After reaction Flow rate: 34.8 mL/min | Notes | |
|---|---|---|---|
| $CO_2$: 10%; | $CO_2$: 11.3%; | Hydrocarbons: | Plasma power: 104 W; |
| $H_2$: 40%; | $H_2$: 24.9%; | $C_2$: 0.6%; | Reactor wall temperature: |
| $N_2$: 36%; | $N_2$: 42.7%; | $C_3$: 0.03%; | 100° C. |
| $CH_4$: 4%; | $CH_4$: 18.3%; | $C_4$=: 0% | Ni/Si = 1/4 Mw-ABC catalyst |
| CO: 10% | CO: 2.0% | $C_4$: 0.21% | 3 mm $BaTiO_3$ PCP |
| | | $C_5$: 0.01% | 50-50 mixture |
| | | Solid: $(NH_4)_2CO_3$ | Electrode Configuration-1 |

TABLE C-2

Reaction-2: Reaction of hydrogen enriched syngas in the catalytic plasma reactor-1 with $CO_2$ and CO when plasma power was 64 W

| Before reaction Flow rate: 50 mL/min | After reaction Flow rate: 46 mL/min | Notes | |
|---|---|---|---|
| $CO_2$: 10%; | $CO_2$: 6.9%; | Hydrocarbons | Plasma power: 64 W; |
| $H_2$: 40%; | $H_2$: 37.2%; | $C_2$: 0.5%; | Reactor wall temperature: 65° C. |
| $N_2$: 36%; | $N_2$: 39.3%; | $C_3$: 0.09%; | Ni/Si = 1/4 Mw-ABC catalyst |
| $CH_4$: 4%; | $CH_4$: 5.2%; | $C_4$=: 0.01% | 3 mm $BaTiO_3$ PCP |
| CO: 10% | CO: 10.6% | $C_4$: 0.2% | 50-50 mixture |
| | | $C_5$: 0.01% | Electrode Configuration-1 |
| | | Solid: $(NH_4)_2CO_3$ | |

TABLE C-3

Reaction-3: Reaction of hydrogen enriched syngas in the catalytic plasma reactor-1 without any $CO_2$ but with enriched CO when plasma power was 100 W

| Before reaction Flow rate: 45 mL/min | After reaction Flow rate: 35 mL/min | Notes | |
|---|---|---|---|
| $CO_2$: 0%; | $CO_2$: 6.2%; | Hydrocarbons: | Plasma power: 100 W; |
| $H_2$: 40%; | $H_2$: 26.9%; | $C_2$: 2.3%; | Reactor wall temperature: |
| $N_2$: 36%; | $N_2$: 43.6%; | $C_3$: 0.3%; | 100° C. |
| $CH_4$: 4%; | $CH_4$: 14.7%; | $C_4$=: 0.1% | Ni/Si = 1/4 Mw-ABC catalyst |
| CO: 20% | CO: 5.5% | $C_4$: 0.3% | 3 mm $BaTiO_3$ PCP |
| | | $C_5$: 0.1% | 50-50 mixture |
| | | Solid: $(NH_4)_2CO_3$ | Electrode Configuration-1 |

The FTIR spectrum (FIG. 9) of the solid material recovered from the reaction matched that of ammonium carbonate showing the formation of this compound. In these examples, hydrogen/nitrogen ratio is well below the optimum value of 3 for ammonia formation. The reactions associated with Reaction-1 (Table C-1) and Reaction-3 (Table C-3) were analyzed and shown to be:

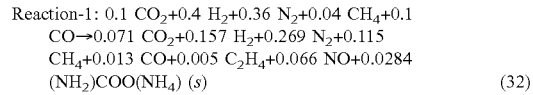

$$\text{Reaction-1: } 0.1\ CO_2 + 0.4\ H_2 + 0.36\ N_2 + 0.04\ CH_4 + 0.1\ CO \rightarrow 0.071\ CO_2 + 0.157\ H_2 + 0.269\ N_2 + 0.115\ CH_4 + 0.013\ CO + 0.005\ C_2H_4 + 0.066\ NO + 0.0284\ (NH_2)COO(NH_4)\ (s) \quad (32)$$

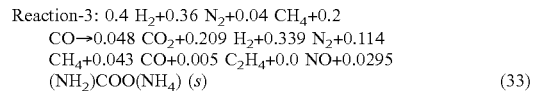

$$\text{Reaction-3: } 0.4\ H_2 + 0.36\ N_2 + 0.04\ CH_4 + 0.2\ CO \rightarrow 0.048\ CO_2 + 0.209\ H_2 + 0.339\ N_2 + 0.114\ CH_4 + 0.043\ CO + 0.005\ C_2H_4 + 0.0\ NO + 0.0295\ (NH_2)COO(NH_4)\ (s) \quad (33)$$

In the above equations, water evolution is assumed to be absent. NO and $NO_2$ can't be measured by Gas Chromatography and hence their concentration (and indeed that of water) are calculated from the mass balance on Carbon, Hydrogen, Nitrogen and Oxygen. It is also known that the concentration of $NO_2$ is low compared with NO when air is subjected to plasma. The solid product $NH_2COONH_4$ (ammonium carbamate) is obtained when $CO_2$ and $NH_3$ react exothermically at atmospheric pressure in the absence of moisture (see Equations 27-31). Ammonium carbamate is highly soluble in water and under moist conditions, the hydration product of ammonium carbamate is ammonium carbonate at room temperature. In the presence of water, the reaction between $CO_2$ and $NH_3$ results in ammonium bicarbonate (Equation 31) or ammonium carbonate depending on the $CO_2/NH_3$ ratio.

In the above reactions we assumed that the solid material obtained was ammonium carbamate rather than ammonium carbonate. We also assumed that $C_{2+}$ hydrocarbons were $C_2H_4$ as we have already shown and that the other $C_{3+}$ or higher hydrocarbons were ignored as their concentrations are very low. Furthermore, it is known that during plasma induced conversion of $N_2+O_2$ the main nitrogen oxide is NO and hence no other $NO_x$ was considered. The mass balance closure [(Mass in)/(Mass out)] for the Reaction-1 was 0.94 while for the Reaction-3 it was 1.02 indicating 6 and 2% accuracy for the reactions (32) and (33) respectively.

The above reactions indicate that it is possible to convert hydrogen enriched syngas to ammonia and allow the produced ammonia to be sequestrated by $CO_2$ while the formation of $NO_x$ could be controlled by controlling the concentration of CO. It is also interesting that ammonium carbamate yield is the same in Reactions-1 and 3. Reaction-2 indicates that at low plasma power, the conversion is very low although we still obtain ammonium carbamate.

The above examples indicate that $CO_2$ can therefore be used as a means of reversible $NH_3$ sequestration in secondary reaction zone 2 (RZ-3) or secondary reaction zone 1 (RZ-2) reaction zones after the generation of $NH_3$ in primary reaction zone (RZ-1) when M-RZR system is used. The solid product recovered from this zone can subsequently be used to recover the nonaqueous ammonia from ammonium carbamate or alternatively, it can be converted to urea.

Example D. Multi-Reaction Zone Reactors in the Catalytic Plasma Reactions Multi-Reaction Zone Reactor (M-RZR) System for Ammonia Production In these experiments, using M-RZR system shown in FIG. 6, we used primary reaction zone (RZ-1) and secondary reaction zone 1 (RZ-2) reactors only. Here we considered two different reactions:

1. Ammonia synthesis and sequestration by using sulphonated PolyHIPE Polymer (s-PHP) chemically represented PHP—$SO_3^-H^+$:
   Reaction-A at primary reaction zone (RZ-1): $N_2+3H_2=2NH_3$ Reaction-B at secondary reaction zone 1 (RZ-2): PHP-$SO_3H$+$NH_3$→PHP—$SO_3NH_4$
2. De-oxygenation of $CO_2$ and the sequestration of the produced $O_2$ using charcoal:
   Reaction-A at primary reaction zone (RZ-1): $CO_2$=CO+½ $O_2$ Reaction-B at secondary reaction zone 1 (RZ-2): Charcoal+$O_2$→Oxidised charcoal+CO The characteristics of these two reaction zones were:

Primary Reaction Zone (RZ-1):

This was the primary reaction zone (RZ-1). The electrode configuration was EC=1 (both electrodes were outside the reaction zone). However, as the walls of the reactor were macro-porous, it can also be assumed that the electrode configuration was infact EC=2. Therefore we denote the EC=½ to indicate the nature of the reactor. The reactants are fed into this zone as shown in FIG. 6. The effluent from primary reaction zone (RZ-1) goes into the second reaction zone secondary reaction zone 1 (RZ-2) where sequestration takes place.

Secondary Reaction Zone 1 (RZ-2):

This reaction zone contained the sequestration agent for the product from primary reaction zone (RZ-1). A large amount of sequestration agent was placed into secondary reaction zone 1 (RZ-2) and it was not removed during the course of the reaction. Therefore, during the production of ammonia and its immediate removal, the sequestration capacity decreased. Furthermore, the cooling facility was not used and as a result of the plasma heating and the thermal insulation of the sequestration agents (especially that of s-PHP) the temperature in the plasma zone—primary reaction zone (RZ-1) increased to ca. 340° C. in 52 h. The reaction mixture from secondary reaction zone 1 (RZ-2) was removed and analyzed. The wall surface of the secondary reaction zone 1 (RZ-2) zone was kept at 100° C.

Example D-1: Multi-Reaction Zone Reactor (M-RZR) System for Ammonia Production

In order to establish the base-line to assess the performance of the M-RZR system, initially, the M-RZR system was used without any sequestration agent in secondary reaction zone 1 (RZ-2). Primary reaction zone (RZ-1) contained 100 mL of a mixture of PCP (3 mm diameter $BaTiO_3$) and silica supported nickel catalyst Ni/Si=¼Mw-ABC at a volumetric ratio=1 (50 v % of PCP and 50 v % of catalyst particles (217)). In these experiments, the temperature inside primary reaction zone (RZ-1) did not exceed 250° C. and the wall temperature was 100° C. The total flow rate of the $H_2$ and $N_2$ feed was 50 mL/min and the $H_2/N_2$ ratio was R=4. The plasma power was 75 W. Ammonia concentration in the effluent was determined through titration as described previously. The effluent flow rate from the reactor was also measured. At the beginning of the experiments, the outlet ammonia concentration increased, while $H_2/N_2$ molar ratio decreased from the initial value of 4 and reached equilibrium and remained at that value. After 24 hours of continuous synthesis, ammonia concentration (C) and nitrogen conversion to ammonia (E) were calculated using the Equations (18) and (20) and the Specific Input Energy (SIE) was calculated from Equation (22).

When the ammonia synthesis was carried out using primary reaction zone (RZ-1) and subsequently sequestrated in secondary reaction zone 1 (RZ-2) which contained 180 g s-PHP, experimental conditions were the same as above. The characteristics of this solid acid polymer are summarised in Table D-1.1 S-PHP was prepared using the method disclosed in U.S. Pat. No. 7,820,729.

TABLE D-1.1

Characteristics of the sulphonated PHP used to sequestrate $NH_3$ produced in RZ-1

| Degree of Sulphonation (%) | Cation Exchange Capacity (CEC) (meq/g) | Full $NH_3$ Absorption Capacity (mM/g) | BET Surface Area ($m^2/g$) | Water Uptake (g/g) |
|---|---|---|---|---|
| 95.6 | 5.31 | 7.06 | 9.4 | 19 |

As the outer wall (215) of the primary reaction zone (RZ-1) reactor is porous, essentially, the ground electrode (11) can be considered to be in contact with the catalyst in the primary reaction zone (RZ-1). Furthermore, as shown previously (U.S. Pat. No. 7,820,729) during the sulphonation of PHP, carbon is generated within the ammonia absorbing s-PHP, thus increasing the electric conductivity of s-PHP. It is therefore justifiable to consider s-PHP as the extension of the ground electrode (11). It is also possible to oxidise this carbon to enhance water absorption capacity and reduce its electric conductivity. Therefore, in a continuous process, the ammonia absorbent, s-PHP can be used as the ground electrode (11) while the high voltage electrode (12) can be incorporated within the primary reaction zone (RZ-1) reactor if high permittivity PCPs are used in primary reaction zone (RZ-1).

It was found that the effluent emerging from secondary reaction zone 1 (RZ-2) did not contain any ammonia indicating that all of the ammonia produced in RZR-1 was sequestrated at secondary reaction zone 1 (RZ-2). At the beginning of the experiment the data based on reduction in volume flow rate at the reactor outlet indicated that the ammonia concentration (C) and conversion (E) were very high. However, both C and E decayed over the 52-hour experimental period as summarised in Table D-1.2. We have also calculated from a plot of C vs. Time, the amount of $NH_3$ absorbed as a function of time and then calculated the amount of s-PHP capacity used during ammonia synthesis.

TABLE D-1.2

Variation with time of ammonia concentration (C), ammonia conversion (E), Specific Input Energy (SIE) and the absorbed ammonia content by sulphonated PHP and the absorbent capacity utilised.

| Time h | Concentration (C) % | Conversion (E) % | SIE (MJ/mol) | $NH_3$ Absorbed mmol/g s-PHP | Absorber capacity used (%) |
|---|---|---|---|---|---|
| 1 | 19.4 | 40.8 | 13.2 | 0.13 | 1.88 |
| 10 | 18.3 | 38.7 | 13.9 | 1.11 | 15.7 |
| 30 | 16.2 | 34.8 | 15.5 | 3.13 | 44.3 |
| 50 | 14.8 | 32.2 | 16.8 | 5.01 | 70.9 |

Table D-1.2 shows that the ammonia absorption increases linearly with time indicating that the absorption mechanism is through acid-base titration and that the cation exchange capacity (CEC) of s-PHP (5.31 meq/g) has not been reached at the end of the 50 hour period. Full ammonia absorption capacity of s-PHP is assumed to be 7.06 mmol/g (from P.

Peng et al. Plasma Chemistry and Plasma Processing, Vol. 36, pp. 1201-1210, 2016). Table D-1.2 also indicates that as the absorption capacity of the s-PHP is used up through reaction of —$SO_3H$ groups with $NH_3$, the conversion of nitrogen to ammonia was reduced. Another reason for the decay of conversion is the fact that due to the batch nature of the process without any heat removal to keep the temperature in primary reaction zone (RZ-1) at the optimum reaction temperature of 200-250° C.

In the case of single stage experiments, the steady state conditions are established within hours when the equilibrium between the temperature (ca. 250° C.) of the plasma reaction zone and the wall temperature (ca. 100° C.) is established. Because the current M-RZR system operates in a semi-batch mode in the sequestration zone—secondary reaction zone 1 (RZ-2) where s-PHP is present, the temperature gradient across the whole reactor is high because s-PHP also acts as a thermal insulator. Temperature of the plasma zone—secondary reaction zone 1 (RZ-2) was measured to be ca. 340° C. at the end of the reaction whereas, the optimum reaction temperature is ca. 200-250° C. when the conversion is maximum. Therefore, the decay of conversion with time is due to the temperature increase in the plasma reaction zone to ca. 340° C., not due to the decay of the ammonia absorption capacity of s-PHP because s-PHP is not renewed during reaction. It can also be seen from Table D-1.2 that the reactive absorption capacity or the total absorption capacity (at 7.06 mmol/g) of s-PHP are not reached. During this period, no ammonia was detected at the outlet of the reactor.

As seen from Table D-1.3, the use of M-RZR system produces a very high ammonia concentration and conversion which results in a 3 fold decrease in Specific Input Energy (SIE). SIE is also dependent on the total input flow rate ($V_T$) of the gases and it was found that the optimum input gas flow rate is ca. 500 mL/min (see Patil et al. Deciphering the plasma-catalyst support interactions for plasma assisted ammonia synthesis in packed DBD reactor. Chemical Engineering Journal. 2016). We can therefore expect further ca. 10 fold reduction in SIE by operating at higher gas feed input rates. This further increase in energy efficiency will make the cost of ammonia production similar to that of the current large scale ammonia production at ca. 1 MJ/mol ammonia.

Table D-1.3 shows the reaction characteristics of ammonia synthesis under 3 different conditions using the same catalyst (Ni/Si=¼-Mw-ABC) and the PCP (3 mm $BaTiO_3$) as a 50-50 mixture.

Example D-2. Carbon Dioxide Conversion to Carbon Monoxide Using Charcoal or Activated Carbon Reaction-A: $CO_2$=CO+½ $O_2$ and Reaction-B: Charcoal+$O_2$→Oxidised charcoal+CO In these reactions, Reaction-A is endothermic but appear to take place readily under plasma. Reaction-B is exothermic and hence there is still a driving force for carbon dioxide conversion to CO and $O_2$. In these experiments, the method used in EXAMPLE-B was replicated. The catalyst loading and PCP (3 mm $BaTiO_3$) were the same as in EXAMPLE-B. However, the reactor (M-RZR) itself was the same as in Section D-1 as shown in FIG. 6. In this case the feed was $CO_2$ only. The secondary reaction zone 1 (RZ-2) of the M-RZR reactor was filled with charcoal and carbon dioxide was passed through it at a rate of 100 ml/min for a period of 70 hours. Carbon dioxide flow rate was then reduced to 50 mL/min and the plasma was switched on at power rating of 50 W. The flow rate of the gases emerging from the reactor was measured and the gases were analyzed to determine their concentration at the outlet using a Gas Chromatograph as described previously in Example-B.

After 20 hours of plasma reaction, the outlet gases were analyzed. The out gas contained: $CO_2$=93.1%; CO=4.6%; $H_2$=0.3; $O_2$=0.2% and $N_2$=1.8%. As seen from this data, oxygen concentration is reduced significantly. However, there were hydrogen and nitrogen gases appearing which are likely to be due to the reaction of oxygen and carbon monoxide with charcoal which also contains nitrogen in its structure. The relatively low level of carbon monoxide in the product gas is due to a number of reasons: 1) Solubility of CO in carbon increases in the presence of catalytic metals (such as Cu, Mn, etc which are also present in charcoal); 2) Some of CO is consumed in reactions leading to the formation of hydrogen and nitrogen. This example indicates that charcoal is used to chemically sequestrate as well as absorb carbon monoxide.

Figure 8:
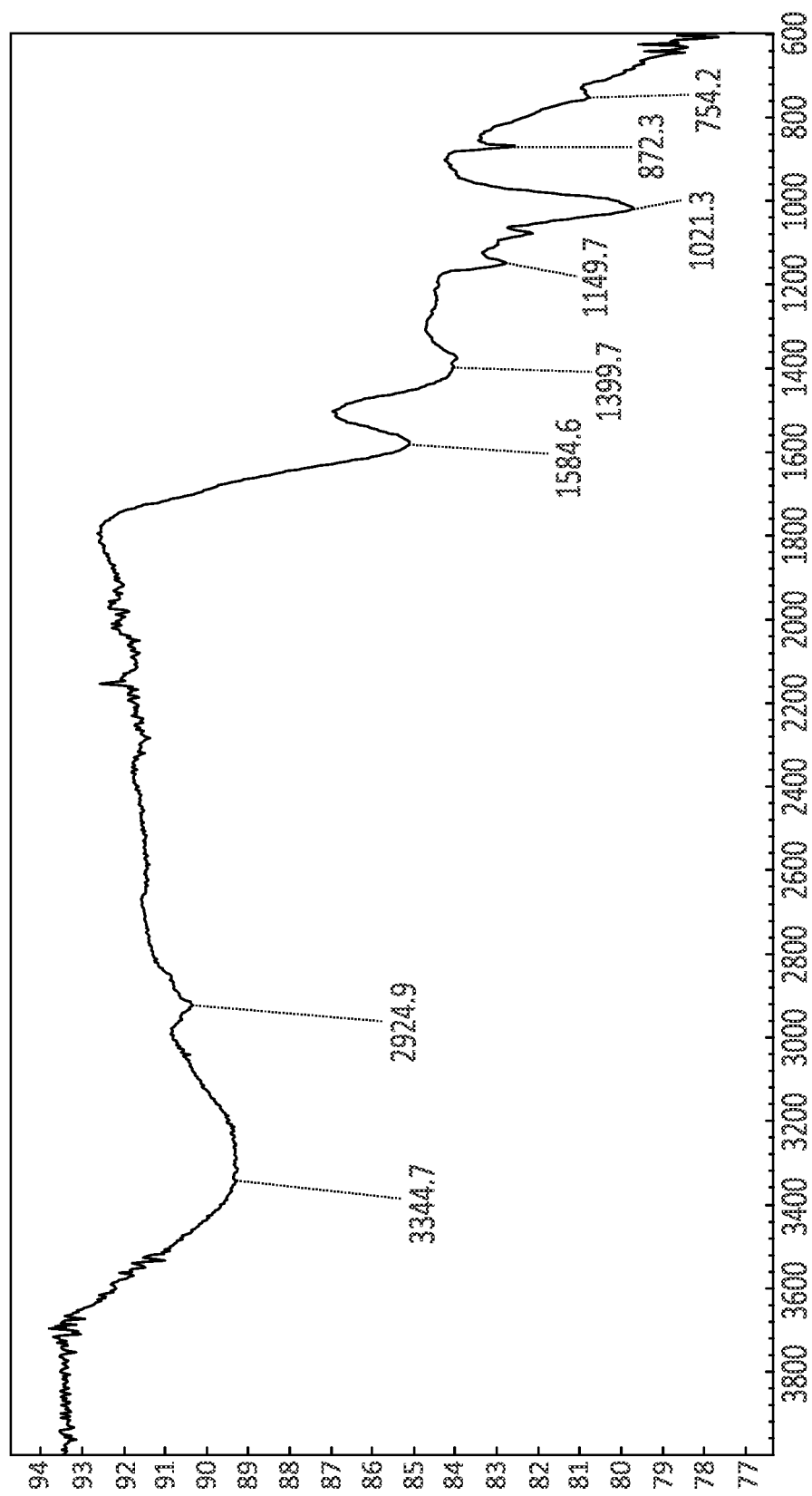
In FIG. 8, FTIR spectrum of charcoal before plasma reaction is given.
Figure 9:
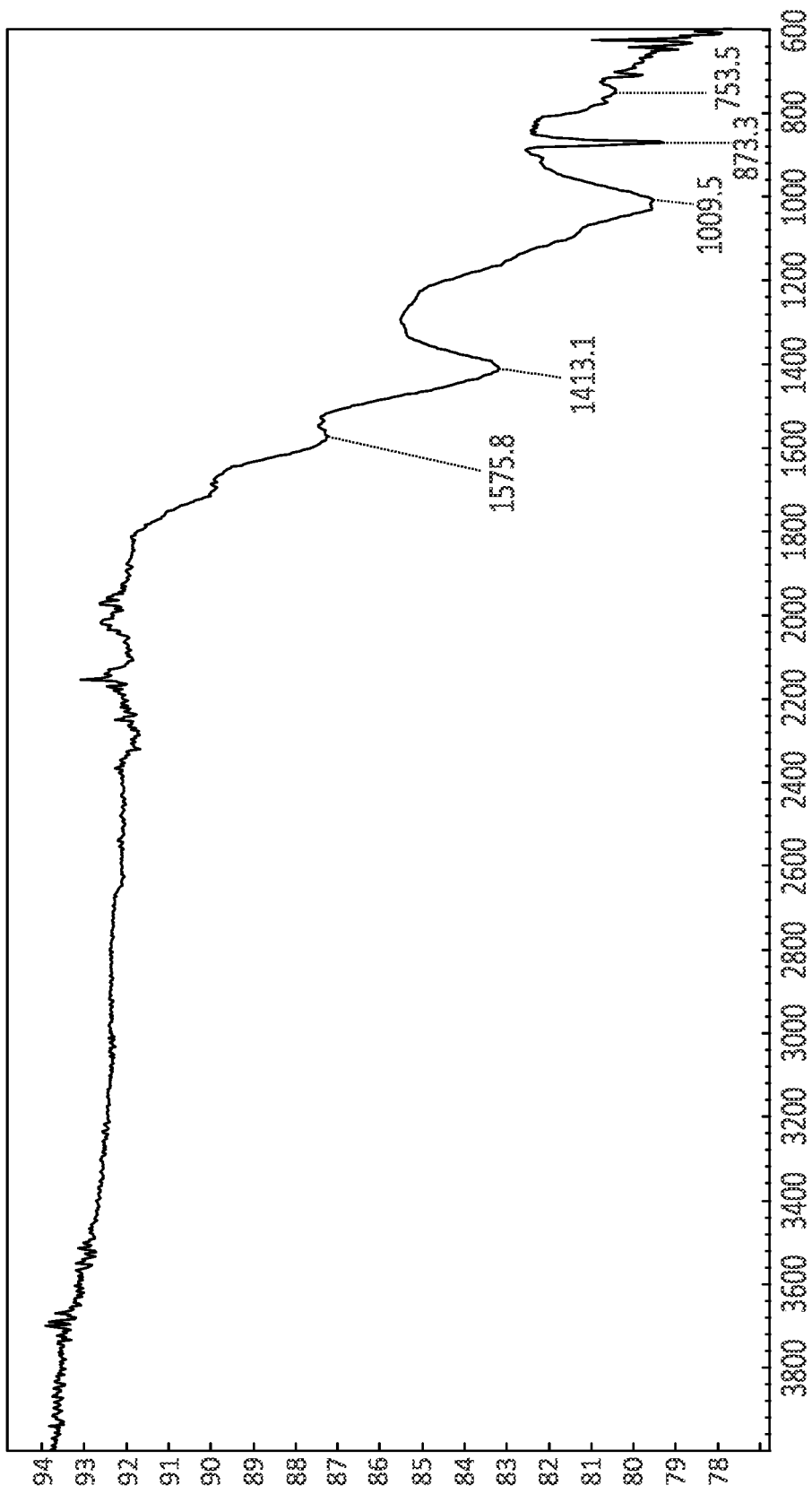
In FIG. 9, FTIR spectrum of charcoal after plasma reaction is given.

In another experiment to detect the chemical changes in charcoal, charcoal particles were placed with $BaTiO_3$ PCP at 50-50 volume percent and excluded the Ni/Si=1/Mw-ABC catalyst. Otherwise, the reaction conditions were the same as in the example D-2.1. After 20 hours of plasma reaction, charcoal from the plasma zone was removed and analyzed by FTIR shown in FIG. 8 and FIG. 9. Before the reaction the FTIR spectrum of charcoal is shown in FIG. 8. FIG. 9 is the spectrum after reaction.

| (Experiment No.) & Catalyst Description | Total inlet gas volume $V_T$ (mL/min) | $H_2$ & $N_2$ Ratio (—) | Electrode Configuration EC (Reactor type) | $NH_3$ Outlet Concen. (C) (Vol %) | $N_2$ Conver. (E) (Mol %) | Wall Power P (W) | Specific Input Energy SIE (MJ/mol) |
|---|---|---|---|---|---|---|---|
| (1) 8 g Ni/Si = 1/4 Mw-ABC 165 g $BaTiO_3$ | 25 | 3 | 1 2 | 6.4 6.4 | 12.0 12.0 | 115 87 | 110 83.3 |
| (2) 8 g Ni/Si = 1/4 Mw-ABC 165 g $BaTiO_3$ | 50 | 4 | 1 | 5.4 | 12.8 | 114 | 42.2 |
| (3) 8 g Ni/Si = 1/4 Mw-ABC 165 g $BaTiO_3$ | 50 | 4 | M-RZR System-1/2 | 19.4 | 40.8 | 75 | 13.2 |

Before the reaction, the spectrum band at wavenumber 3316 cm$^{-1}$, v(O—H), represent the hydroxyl groups in phenolic and aliphatic structures while the band at 2943 cm$^{-1}$, v(O—H), is C—H stretching in aromatic methoxyl and methyl and methylene groups. Both of these bands disappear after the oxidation of charcoal as seen in FIG. 9. Most importantly, as seen in these two spectra, a broad band at 1740 cm$^{-1}$ appears in FIG. 9 after the reaction of charcoal with oxygen. This band, v(C=O), is due to unconjugated C=O stretching vibrations in carbonyl groups of hemicellulose which is due to the combustion reaction of carbon and oxygen. These results show that, oxygen produced during the de-oxygenation reaction of $CO_2$ reacts with carbon to produce carbonyl groups.

The above results further show the significance of the ammonia (or product) sequestration through a chemical reaction because the sequestration is not dependent on temperature and often such systems have significantly higher absorption capacity compared with those absorbers based on secondary bonding.

Absorbers, based on solid acids, cationic liquids or secondary bonding must also be accessible to ammonia through enhanced surface area and hierarchic interconnecting pore structure such as the s-PHP used in this example. However, most solid acids do not have such pore structures to accelerate the acid-base neutralization reactions and hence the neutralization reaction is diffusion controlled. Furthermore, crystalline solid acids exhibit further resistance to diffusion and reaction and non-crystalline or solid acids with small crystals would be preferable in the form of powders. However, in powder form of the absorbers, ammonia gas may bypass without reaction through channelling. Therefore, the use of s-PHP type of sequestration media in a monolithic form will enhance the available surface area for acid-base reaction during the sequestration process.

Porous solid acids with an hierarchic pore structure can be prepared by dissolving the said solid acid in water and allowing the solution to be absorbed by any hydrophilic open pore foams such as hydrophilic PHPs including s-PHP. Infact, solid acids can be incorporated into PHP at the emulsification stage when a high internal phase emulsion was produced which is subsequently polymerized to obtain PolyHIPE Polymer (see G. Akay et al., European Patents: EP 1183328 and EP 2342272). Alternative to s-PHP as a hydrophilic open pore foams include but are not confined to, vinyl pyridine-styrene copolymer crosslinked with divinyl benzene (DVB) or styrene-ethylene glycol dimethylacrylate copolymer in which ethylene glycol dimethylacrylate also acts as the crosslinker. These materials can also take-up and swell in water.

It is also possible to use hydrophilic fibres obtained from the carboxylation or sulphonation of cellulose. In order to enhance the cation capacity of polysulphonic acids it is possible to use hypercrosslinked polystyrene where the number of sulphonated site per styrene monomer is more than one.

Supported acids, including silica or zeolite supported sulphuric or sulphonic acids can be used as ammonia absorbents. Polyacids such as citric acid provide enhanced cation exchange capacity for ammonia but at the same time such acids can release ammonia at high temperatures.

Hydroxyapatite supported citric acid is particularly useful, as the support material hydroxyapatite is an abundant natural substance. In agricultural applications when bacteria is used for nitrogen fixation, they can be supported in the pores of hydroxyapatite coated sulphonated-ammonia neutralized PolyHIPE Polymer. This will increase the viability and proliferation of the bacteria thus enhancing the growth rate and yield of the plants. The administration of hydroxyapatite into styrene or vinyl pyridine-styrene PolyHIPE Polymers can be carried out during the emulsification stage.

In some cases, ammonia absorption needs to be reversible when ammonia is needed in anhydrous form for fuel applications and as a means of hydrogen storage. This type of chemical sequestration is carried out with a suitable solid acid, either within a porous structure coated with a solid acid or as a solid acid powder. Subsequently the temperature of the neutralized solid acid is raised to a level where the neutralizsation reaction is reversed thus releasing $NH_3$ as gas.

Solid acids suitable for reversible or irreversible ammonia sequestration include but are not limited to: benzoic acid, citric acid, glyoxylic acid, glycerol phosphoric acid, acetic acid etc.

Gases such as $CO_2$ and $SO_2$ can also be used for ammonia sequestration as demonstrated. Therefore, solid, liquid or gases can be used in the ammonia sequestration process. In particular, when the gaseous ($CO_2$) or liquid (such as acetic acid) absorbent react with $NH_3$ to produce a solid ammonium salt, the recovery of the sequestrated ammonia becomes very easy.

Example E. Multi-Reaction Zone Reactors with Non-Thermal Plasma

Figure 10A:
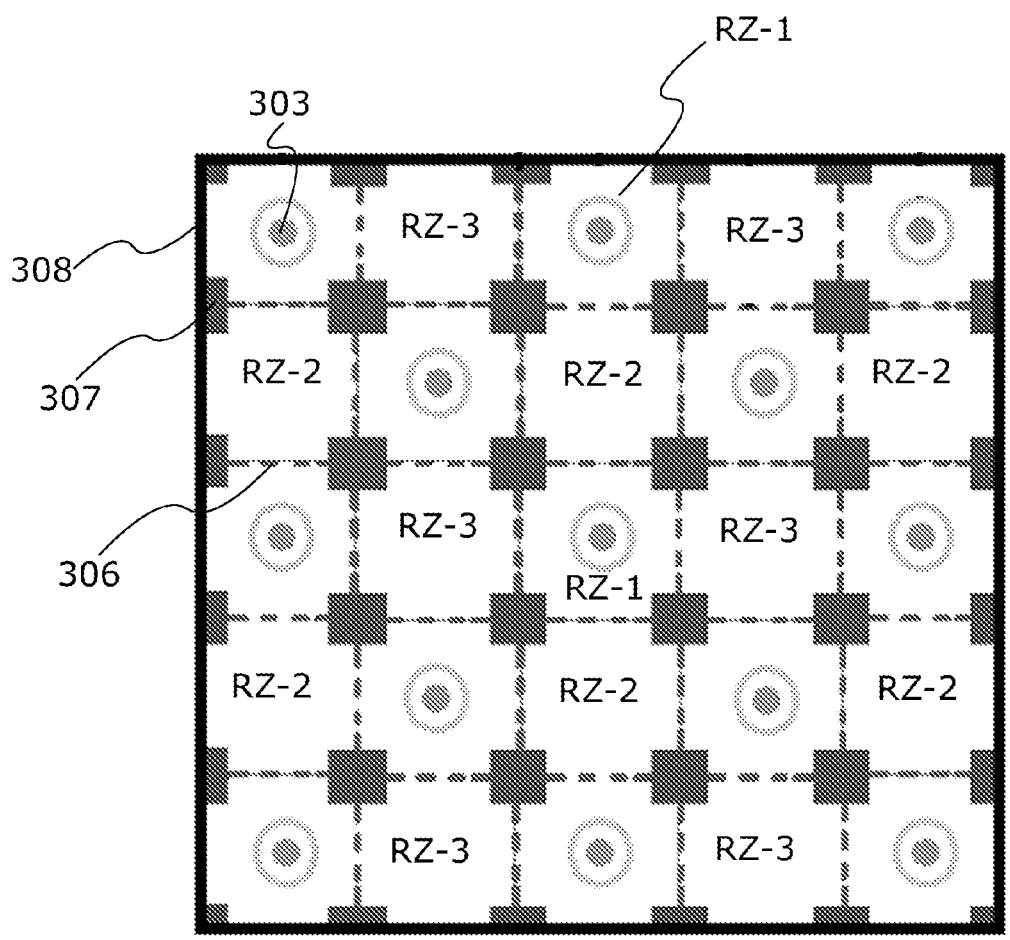
In FIG. 10a, top view of the connectivity and electrode arrangement in a 3-reaction zone reactor in planar configuration is given.
Figure 10B:
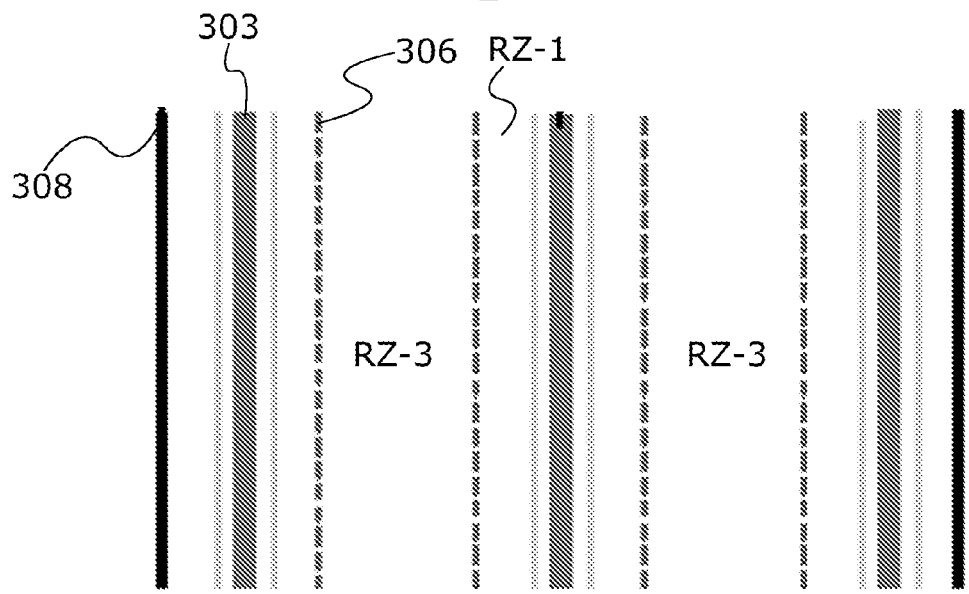
In FIG. 10b, cross-section of the connectivity and electrode arrangement of the 3-reaction zone reactor in planar configuration is given.

In order to obtain industrially viable and energy efficient Multi-Reaction Zone Reactor systems working with plasma or other sources of high density energy to activate the reactions in various reaction zones, several different reactor configurations can be designed. FIG. 10*a* and FIG. 10*b* represents a planar reactor (as opposed to concentric cylinder design used in this invention).

The M-RZR system shown in FIG. 10*a* and FIG. 10*b* has 3 reaction zones. Primary reaction zone (RZ-1) has a centrally placed plasma high voltage element with dielectric walls (302) and a central high voltage electrode (303). The Secondary reaction zone 1 (RZ-2) and Secondary reaction zone 2 (RZ-3) surround RZ-1 through a network of porous ground electrodes (306) which infact can contain a suitable catalyst in them. These ground electrodes are in the form of porous plates supported by electrode holders (307). The whole of the M-RZR system is enclosed by the non-porous ground electrode (308) and subsequently insulated through the outer-most casing.

RZ-1 reaction space contains plasma catalysis promoter particles as well as catalyst. Plasma is generated in the reaction space of RZ-1 as well as within the pores of the porous ground electrodes (306). Therefore, additional catalyst can be inserted into the pores of the ground electrode (306).

It is possible to place RZ-3 within RZ-2 so that RZ-3 is not in contact with RZ-1 directly. Furthermore, the unreacted reactants can be withdrawn from RZ-2 and RZ-3 at different rates to allow different residence times within in each of the secondary reaction zone 1 and secondary reaction zone 2 (RZ-3). The temperature of each zone can be controlled separately thus promoting selectivity for the reactions in each zone.

Figure 11:
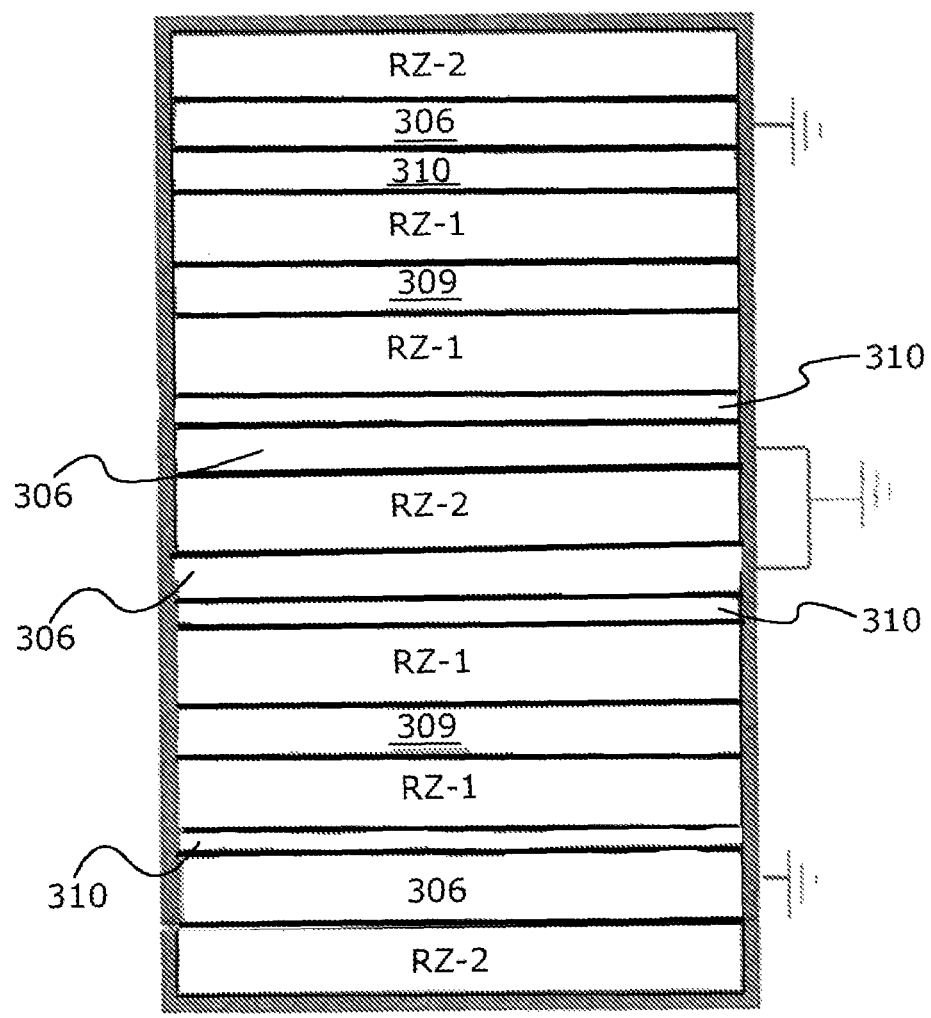
In FIG. 11, top view of the connectivity and electrode arrangement of a 2-reaction zone reactor in planar configuration is given.

The 3-reaction zone reactor system described above can be converted to a 2-reaction zone reactor system by operating the secondary reaction zone 1 (RZ-2) and secondary reaction zone 2 (RZ-3) under the same conditions. However, a more efficient and simple planar reactor system is diagrammatically illustrated in FIG. 11 which illustrates the connectivity and electrode arrangement when the primary reaction zone (RZ-1), is a plasma reactor as seen from the top of the reactor. Here, the ammonia sequestration achieved by sulphonated PolyHIPE Polymer present in the secondary reaction zone 1 (RZ-2). S-PHP is loaded from the top and withdrawn from the bottom of the reactor in batches through an air lock. On the other hand, the reactants, hydrogen and ammonia are fed from the bottom of the reactor and the unreacted $N_2$ and $H_2$ are withdrawn from the top and recycled back. The porous ground electrodes (306) are made from porous stainless while the solid high voltage electrode (309) is made from solid (or porous) stainless steel and may contain catalyst in their pores. Ammonia is generated in the primary reaction zone (RZ-1) which contains the catalyst and Plasma Catalysis Promotor (PCP). Ammonia generated in primary reaction zone (RZ-1) diffuses through the porous electrodes into the secondary reaction zone (RZ-2) where it reacts with s-PHP (as solid acid). Dielectric barrier material (310) is optionally porous when plasma catalyst promotors are used in the plasma space of primary reaction zone (RZ-1).

REFERENCE NUMBERS

A1 Reactant $A_1$
A2 Reactant $A_2$
A3 Reactant $A_3$
A4 Reactant $A_4$
B1 Product $B_1$
B2 Product $B_2$
B3 Product $B_3$
B4 Product $B_4$
RZ-1 Primary reaction zone
RZ-2 Secondary reaction zone 1
RZ-3 Secondary reaction zone 2
11 Ground electrode
12 High voltage electrode
13 Primary inlet
14 Secondary inlet
15 Primary outlet
16 Secondary outlet
17 Heating/cooling coil
18 Secondary cooling coil
202-n Gas cylinder
203-n Mass Flow Controller
204 Primary gas mixer
205 Glass wool
208 Power supply
209 Annular gap
211 Ice trap
212 Low temperature trap
213 Nitrogen cylinder
214 Secondary gas mixer
215 Outer wall
216 Inner wall
217 Catalyst particle
221 Inlet for the reactants
222 Catalyst and PCP space
223 Product outlet
303 Central high voltage electrode
306 Porous ground electrode
307 Electrode holder
308 Non-porous ground electrode
309 Solid (or porous) high voltage electrode
310 Dielectric barrier material

The invention claimed is:
1. A multi-reaction zone reactor comprising:
a primary reaction zone comprising a solid inner wall and a perforated outer wall, the primary reaction zone configured to produce ammonia or an ammonia derivative;
a secondary reaction zone comprising an ammonia absorbing material capable of selectively absorbing ammonia or the ammonia derivative; and
a second secondary reaction zone comprising a cooling coil;
wherein:
the primary reaction zone is provided at the center of the multi-reaction zone reactor;
the secondary reaction zone is positioned in a manner encircling at least a portion of the primary reaction zone; and
the primary reaction zone and the secondary reaction zone are not separated by discrete physical barriers.
2. The multi-reaction zone reactor according to claim 1, wherein the perforated outer wall comprises perforations having a size of about 1 mm.
3. The multi-reaction zone reactor according to claim 1, wherein the primary reaction zone comprises a tubular reactor.
4. The multi-reaction zone reactor according to claim 1, wherein the primary reaction zone, where ammonia is produced, is provided in the form of flat porous plates acting as ground electrodes as well as defining the reaction zones.
5. The multi-reaction zone reactor according to claim 1, wherein the second secondary reaction zone comprises an ionic liquid, water, an acid, a sulphonated PolyHIPE polymer, or combinations thereof.
6. The multi-reaction zone reactor according to claim 1, wherein the cooling coil is configured to condense unabsorbed or unreacted ammonia.
7. The multi-reaction zone reactor according to claim 1, wherein the solid inner wall is quartz.
8. The multi-reaction zone reactor according to claim 1, wherein the solid inner wall forms a tube comprising a high voltage electrode.
9. The multi-reaction zone reactor according to claim 1, wherein the primary reaction zone comprises a ground electrode.
10. The multi-reaction zone reactor according to claim 1, wherein the secondary reaction zone comprises solid acid particles.
11. The multi-reaction zone reactor according to claim 10, wherein the solid acid particles comprises a sulphonated PolyHIPE Polymer.
12. The multi-reaction zone reactor according to claim 11, wherein the secondary reaction zone comprises a primary outlet for ammonia sequestrated sulphonated PolyHIPE Polymer.
13. A multi-reaction zone reactor comprising:
a primary reaction zone comprising a solid inner wall and a perforated outer wall, the primary reaction zone configured to produce ammonia or an ammonia derivative; and
a secondary reaction zone comprising an ammonia absorbing material capable of selectively absorbing ammonia or the ammonia derivative;
wherein the primary reaction zone and the secondary reaction zone are not separated by discrete physical barriers; and
wherein the solid inner wall is quartz.
14. The multi-reaction zone reactor according to claim 13, wherein the secondary reaction zone comprises solid acid particles.

15. The multi-reaction zone reactor according to claim 14, wherein the solid acid particles comprises a sulphonated PolyHIPE Polymer.

16. The multi-reaction zone reactor according to claim 15, wherein the secondary reaction zone comprises a primary outlet for ammonia sequestrated sulphonated PolyHIPE Polymer.

17. The multi-reaction zone reactor according to claim 13, wherein the solid inner wall forms a tube comprising a high voltage electrode.

18. The multi-reaction zone reactor according to claim 13, wherein the primary reaction zone comprises a ground electrode.

\* \* \* \* \*